US012671466B2

(12) United States Patent
Oh et al.

(10) Patent No.: US 12,671,466 B2
(45) Date of Patent: Jun. 30, 2026

(54) METHOD AND DEVICE FOR TRANSMITTING AND RECEIVING SIGNAL IN WIRELESS COMMUNICATION SYSTEM

(71) Applicant: LG Electronics Inc., Seoul (KR)

(72) Inventors: Jaeky Oh, Seoul (KR); Myunghee Lee, Seoul (KR); Jaehoon Chung, Seoul (KR); Jaeyong Park, Seoul (KR); Sungjin Kim, Seoul (KR); Jihwan Jang, Seoul (KR); Yecheng He, Seoul (KR)

(73) Assignee: LG Electronics Inc., Seoul (KR)

( * ) Notice: Subject to any disclaimer, the term of this patent is extended or adjusted under 35 U.S.C. 154(b) by 307 days.

(21) Appl. No.: 18/685,463

(22) PCT Filed: Jul. 4, 2022

(86) PCT No.: PCT/KR2022/009614
    § 371 (c)(1),
    (2) Date: Feb. 21, 2024

(87) PCT Pub. No.: WO2023/027321
    PCT Pub. Date: Mar. 2, 2023

(65) Prior Publication Data
    US 2024/0356587 A1    Oct. 24, 2024

(30) Foreign Application Priority Data
    Aug. 25, 2021    (KR) ........................ 10-2021-0112636

(51) Int. Cl.
    H04B 7/04    (2017.01)
    H04L 5/00    (2006.01)
    H04W 24/10    (2009.01)

(52) U.S. Cl.
    CPC ....... *H04B 7/04026* (2023.05); *H04L 5/0048* (2013.01); *H04W 24/10* (2013.01)

(58) Field of Classification Search
    CPC ............ H04B 7/04026; H04B 7/04013; H04B 7/06952; H04B 7/0617; H04B 7/0626;
    (Continued)

(56) References Cited

U.S. PATENT DOCUMENTS

| | | | |
|---|---|---|---|
| 11,616,549 B2 * | 3/2023 | Park ...................... | H04W 72/56 375/262 |
| 2018/0123668 A1 * | 5/2018 | Kwak ................... | H04L 5/0023 |

(Continued)

OTHER PUBLICATIONS

Extended European Search Report in European Appln. No. 22861535.7, mailed on Jun. 17, 2025, 10 pages.

(Continued)

*Primary Examiner* — Harunur Rashid
(74) *Attorney, Agent, or Firm* — Fish & Richardson P.C.

(57) ABSTRACT

The present disclosure may include receiving, by a terminal in a wireless communication system, at least one reference signal from a base station, generating channel status information after channel measurement based on the at least one reference signal, and giving feedback on the generated channel status information to the base station, wherein the at least one reference signal may be a reference signal that is transmitted from the base station to the terminal through a reconfigurable intelligent surface (RIS), and first beamforming transmitted from the base station to the RIS may be determined based on the feedback.

13 Claims, 24 Drawing Sheets

(58) Field of Classification Search
CPC ..... H04L 5/0048; H04L 5/00; H04L 25/0202;
H04W 24/10; H01Q 1/246; H01Q 3/46;
H01Q 15/08; H01Q 15/0006; G06N 3/02;
G06N 3/092
See application file for complete search history.

(56) References Cited

U.S. PATENT DOCUMENTS

2021/0013619 A1* 1/2021 Alkhateeb .......... H04B 7/04013
2021/0126359 A1* 4/2021 Kim ....................... H04B 7/145
2022/0408446 A1* 12/2022 Zirwas ................. H04W 24/08
2023/0103220 A1* 3/2023 Pezeshki ................. H04B 7/08
370/329
2023/0247646 A1* 8/2023 Levitsky .............. H04L 5/0057
370/329

OTHER PUBLICATIONS

Wu et al., "Intelligent Reflecting Surface Aided Wireless Communications: A Tutorial," CoRR, Submitted on Jul. 7, 2020, arXiv:2007. 02759v2, 74 pages.

* cited by examiner

Figure 3:
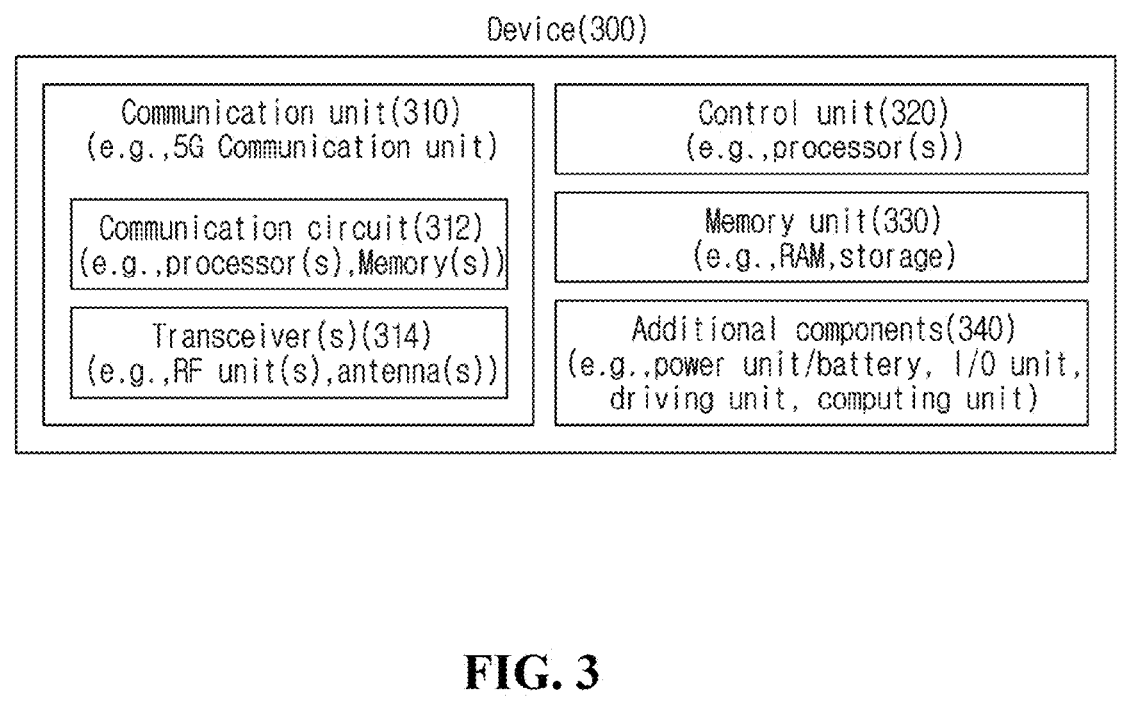

Device(300)

Communication unit(310)
(e.g.,5G Communication unit)

Communication circuit(312)
(e.g.,processor(s),Memory(s))

Transceiver(s)(314)
(e.g.,RF unit(s),antenna(s))

Control unit(320)
(e.g.,processor(s))

Memory unit(330)
(e.g.,RAM,storage)

Additional components(340)
(e.g.,power unit/battery, I/0 unit,
driving unit, computing unit)

METHOD AND DEVICE FOR TRANSMITTING AND RECEIVING SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2022/009614, filed on Jul. 4, 2022, which claims the benefit of Korean Patent Application No. 10-2021-0112636, filed on Aug. 25, 2021. The disclosures of the prior applications are incorporated by reference in their entirety.

TECHNICAL FIELD

The present disclosure relates to a wireless communication system, and more particularly, to a method and device for transmitting and receiving a signal by a terminal and a base station in a wireless communication system.

Especially, a method and a device may be provided for transmitting and receiving a signal by a terminal and a base station by controlling a radio channel environment through a reconfigurable intelligent surface (RIS).

BACKGROUND

Radio access systems have come into widespread in order to provide various types of communication services such as voice or data. In general, a radio access system is a multiple access system capable of supporting communication with multiple users by sharing available system resources (bandwidth, transmit power, etc.). Examples of the multiple access system include a code division multiple access (CDMA) system, a frequency division multiple access (FDMA) system, a time division multiple access (TDMA) system, a single carrier-frequency division multiple access (SC-FDMA) system, etc.

In particular, as many communication apparatuses require a large communication capacity, an enhanced mobile broadband (eMBB) communication technology has been proposed compared to radio access technology (RAT). In addition, not only massive machine type communications (MTC) for providing various services anytime anywhere by connecting a plurality of apparatuses and things but also communication systems considering services/user equipments (UEs) sensitive to reliability and latency have been proposed. To this end, various technical configurations have been proposed.

SUMMARY

The present disclosure may provide a device and method for transmitting a signal in a wireless communication system.

The present disclosure may provide a method for transmitting and receiving a signal by a terminal and a base station using a reconfigurable intelligent surface (RIS) in a wireless communication system.

The present disclosure may provide a method for transmitting and receiving a signal based on a meta lens in an outdoor-to-indoor (O2I) environment in a wireless communication system.

The present disclosure may provide a method for controlling a RIS based on an artificial intelligence (AI) in a wireless communication system.

The present disclosure may provide a method for transmitting and receiving a signal by a terminal and a base station based on a smart radio environment (SRE) in a wireless communication system.

The technical objects to be achieved in the present disclosure are not limited to the above-mentioned technical objects, and other technical objects that are not mentioned may be considered by those skilled in the art through the embodiments described below.

As an example of the present disclosure, a method for operating a terminal in a wireless communication system may include receiving at least one reference signal from a base station, generating channel status information after channel measurement based on the at least one reference signal, and giving feedback on the generated channel status information to the base station, the at least one reference signal is a reference signal that is transmitted from the base station to the terminal through a reconfigurable intelligent surface (RIS), and first beamforming transmitted from the base station to the RIS may be determined based on the feedback.

In addition, as an example of the present disclosure, a method for operating a base station in a wireless communication system may include transmitting, by the base station, at least one reference signal and receiving channel status information measured based on the at least one reference signal, the at least one reference signal is a reference signal that is transmitted from the base station to a terminal through a reconfigurable intelligence surface (RIS), and first beamforming transmitted from the base station to the RIS may be determined based on feedback.

In addition, as an example of the present disclosure, a terminal in a wireless communication system may include a transceiver and a processor coupled with the transceiver, the processor may control the transceiver to receive at least one reference signal from a base station, to generate channel status information after channel measurement based on the at least one reference signal, and to give feedback on the generated channel status information to the base station, the at least one reference signal is a reference signal that is transmitted from the base station to the terminal through a reconfigurable intelligent surface (RIS), and first beamforming transmitted from the base station to the RIS may be determined based on the feedback.

In addition, as an example of the present disclosure, a base station in a wireless communication system may include a transceiver and a processor coupled with the transceiver, the processor may control the transceiver to transmit at least one reference signal from the base station and to receive channel status information measured based on the at least one reference signal, the at least one reference signal is a reference signal that is transmitted from the base station to a terminal through a reconfigurable intelligence surface (RIS), and first beamforming transmitted from the base station to the RIS may be determined based on feedback.

In addition, as an example of the present disclosure, a device including at least one memory and at least one processor functionally coupled with the at least one memory, the at least one processor may control the device to receive at least one reference signal from a base station, to generate channel status information after channel measurement based on the at least one reference signal, and to give feedback on the generated channel status information to the base station, the at least one reference signal is a reference signal that is transmitted from the base station to a terminal through a reconfigurable intelligent surface (RIS), and first beamforming transmitted from the base station to the RIS may be determined based on the feedback.

In addition, as an example of the present disclosure, a non-transitory computer-readable medium storing at least one instruction includes the at least one instruction that is executable by a processor, the at least one instruction may control a device to receive at least one reference signal from a base station, to generate channel status information after channel measurement based on the at least one reference signal, and to give feedback on the generated channel status information to the base station, the at least one reference signal is a reference signal that is transmitted from the base station to a terminal through a reconfigurable intelligent surface (RIS), and first beamforming transmitted from the base station to the RIS may be determined based on the feedback.

In addition, the following may commonly apply.

In addition, as an example of the present disclosure, a terminal may transmit a first RIS use request signal to a RIS before receiving at least one reference signal, the RIS may operate based on an initial recognition mode, and the initial recognition mode may be determined based on a number of sub-arrays and a minimum number of beams based on at least one meta lens element in a RIS.

In addition, as an example of the present disclosure, an initial recognition mode may be determined according to a number of sub-arrays and a minimum number of beams, which satisfy a frequency rate direction constant derived based on frequency rate learning information on a terminal direction, and in case there is no combination for the number of sub-arrays and the minimum number of beams that satisfy the frequency rate direction constant, the number of sub-arrays may be set to 1, and in case the number of sub-arrays is 1, a RIS may generate a fixed spherical wave.

In addition, as an example of the present disclosure, after first beamforming is determined, a terminal may transfer a second RIS use request signal to a RIS and receive a reference signal for the first beamforming from a base station through the RIS based on RIS resource information allocated by the RIS.

In addition, as an example of the present disclosure, a terminal may generate and transmit a RIS control value to a RIS based on a reference signal for first beamforming and perform communication based on second beamforming generated by the RIS that is controlled based on the RIS control value.

In addition, as an example of the present disclosure, a second RIS use request signal may include at least any one of RIS ID information, terminal ID information, and sub-array position information.

In addition, as an example of the present disclosure, after first beamforming is determined, a terminal may transfer a second RIS use request signal to a RIS and receive a reference signal and data for the first beamforming from a base station through the RIS based on RIS resource information that is allocated by the RIS.

In addition, as an example of the present disclosure, a terminal may generate and transmit a RIS control value based on a reference signal for first beamforming to a RIS and perform communication based on second beamforming that is generated by the RIS that is controlled based on the RIS control value.

In addition, as an example of the present disclosure, a terminal may obtain at least any one or more of reward information and channel status information based on a reference signal for first beamforming and generate a RIS control value through at least any one of the reward information and the channel status information.

In addition, as an example of the present disclosure, a RIS control value may be information that is generated through a codebook based on a RIS direction vector set.

In addition, as an example of the present disclosure, in case data transmitted together with a reference signal for first beamforming is transmitted to a terminal through a RIS, the RIS may operate based on an initial recognition mode.

In addition, as an example of the present disclosure, a reference signal for first beamforming may be transmitted to a terminal through a first sub-array of a RIS, and data about the first beamforming may be transmitted to the terminal through a second sub-array of the RIS.

In addition, as an example of the present disclosure, a first sub-array may be transmitted to a terminal through a beam that is changed based on at least one first sub-array element, and a second sub-array may be transmitted to the terminal through a beam that is fixed based on an initial recognition mode.

As is apparent from the above description, the embodiments of the present disclosure have the following effects.

In embodiments based on the present disclosure, it is possible to provide a method for transmitting and receiving a signal by a terminal and a base station by using a reconfigurable intelligent surface (RIS).

In embodiments based on the present disclosure, it is possible to provide a method for transmitting and receiving a signal based on a meta lens in an outdoor-to-indoor (O2I) environment.

In embodiments based on the present disclosure, it is possible to provide a method for controlling a RIS based on an artificial intelligence (AI).

In embodiments based on the present disclosure, it is possible to provide a method for transmitting and receiving a signal by a terminal and a base station in a smart radio environment (SRE).

It will be appreciated by persons skilled in the art that that the effects that can be achieved through the embodiments of the present disclosure are not limited to those described above and other advantageous effects of the present disclosure will be more clearly understood from the following detailed description. That is, unintended effects according to implementation of the present disclosure may be derived by those skilled in the art from the embodiments of the present disclosure.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

FIG. 3 illustrates another example of a wireless device applicable to the present disclosure.

DETAILED DESCRIPTION

Figure 1:
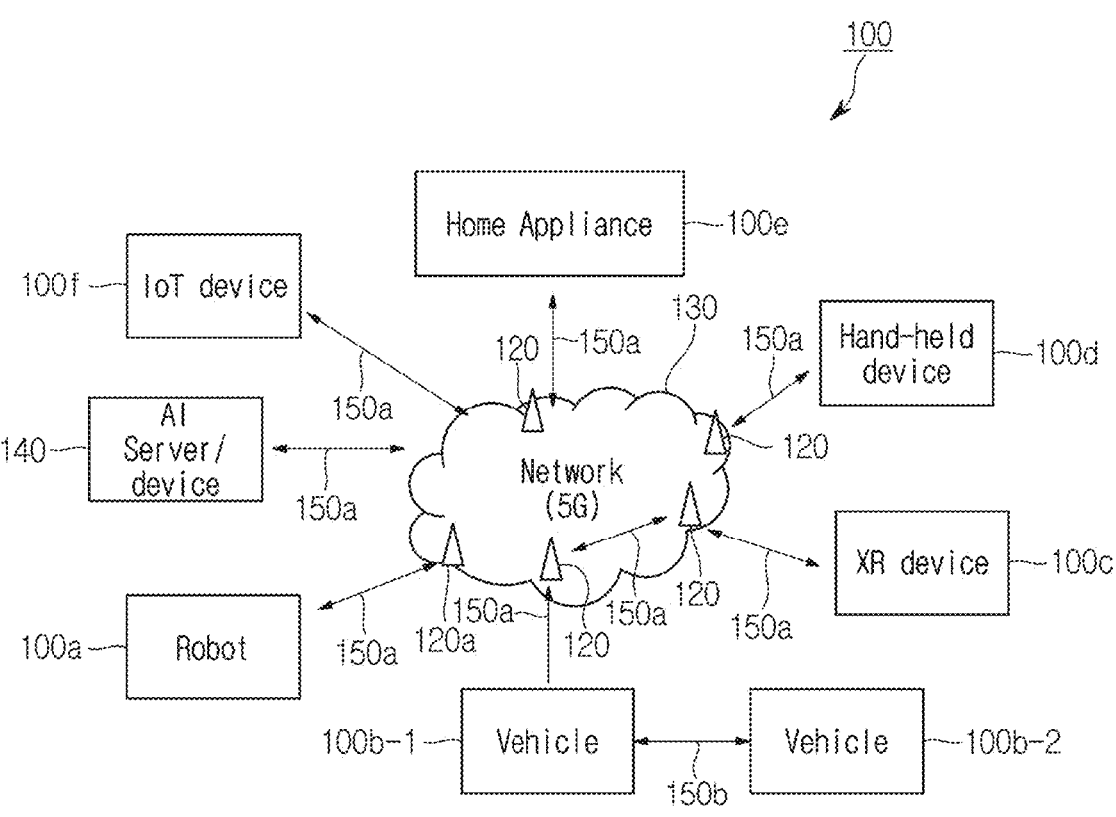
FIG. 1 illustrates an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an uplink (UL). Likewise, the mobile station may serve as a receiver and the BS may serve as a transmitter, on a downlink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5th generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as code division multiple access (CDMA), frequency division multiple access (FDMA), time division multiple access (TDMA), orthogonal frequency division multiple access (OFDMA), single carrier frequency division multiple access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail. LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 illustrates an example of a communication system applicable to the present disclosure.

Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include an unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120 and the network 130 may be implemented by a wireless device, and a specific wireless device 120a may operate as a base station/network node for another wireless device.

The wireless devices 100a to 100f may be connected to the network 130 through the base station 120. AI technology is applicable to the wireless devices 100a to 100f, and the wireless devices 100a to 100f may be connected to the AI server 100g through the network 130. The network 130 may be configured using a 3G network, a 4G (e.g., LTE) network or a 5G (e.g., NR) network, etc. The wireless devices 100a to 100f may communicate with each other through the base station 120/the network 130 or perform direct communication (e.g., sidelink communication) without through the base station 120/the network 130. For example, the vehicles 100b-1 and 100b-2 may perform direct communication (e.g., vehicle to vehicle (V2V)/vehicle to everything (V2X) communication). In addition, the IoT device 10f (e.g., a sensor) may perform direct communication with another IoT device (e.g., a sensor) or the other wireless devices 100a to 100f.

Communication System Applicable to the Present Disclosure

Figure 2:
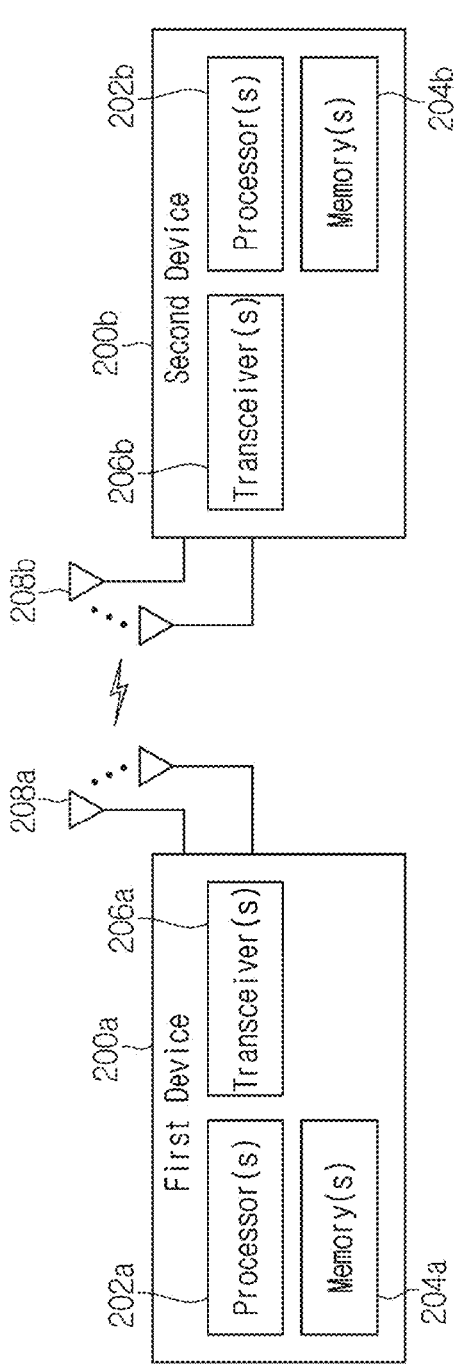
FIG. 2 illustrates an example of a wireless apparatus applicable to the present disclosure.

FIG. 2 illustrates an example of a wireless device applicable to the present disclosure.

Referring to FIG. 2, a first wireless device 200a and a second wireless device 200b may transmit and receive radio signals through various radio access technologies (e.g., LTE or NR). Here, {the first wireless device 200a, the second wireless device 200b} may correspond to (the wireless device 100x, the base station 120) and/or (the wireless device 100x, the wireless device 100x) of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202*a* may process information in the memory 204*a* to generate first information/signal and then transmit a radio signal including the first information/signal through the transceiver 206*a*. In addition, the processor 202*a* may receive a radio signal including second information/signal through the transceiver 206*a* and then store information obtained from signal processing of the second information/signal in the memory 204*a*. The memory 204*a* may be coupled with the processor 202*a*, and store a variety of information related to operation of the processor 202*a*. For example, the memory 204*a* may store software code including instructions for performing all or some of the processes controlled by the processor 202*a* or performing the descriptions, functions, procedures, proposals, methods and/or operational flowcharts disclosed herein. Here, the processor 202*a* and the memory 204*a* may be part of a communication modem/circuit/chip designed to implement wireless communication technology (e.g., LTE or NR). The transceiver 206*a* may be coupled with the processor 202*a* to transmit and/or receive radio signals through one or more antennas 208*a*. The transceiver 206*a* may include a transmitter and/or a receiver. The transceiver 206*a* may be used interchangeably with a radio frequency (RF) unit. In the present disclosure, the wireless device may refer to a communication modem/circuit/chip.

The second wireless device 200*b* may include one or more processors 202*b* and one or more memories 204*b* and may further include one or more transceivers 206*b* and/or one or more antennas 208*b*. The processor 202*b* may be configured to control the memory 204*b* and/or the transceiver 206*b* and to implement the descriptions, functions, procedures, proposals, methods and/or operational flowcharts disclosed herein. For example, the processor 202*b* may process information in the memory 204*b* to generate third information/signal and then transmit the third information/signal through the transceiver 206*b*. In addition, the processor 202*b* may receive a radio signal including fourth information/signal through the transceiver 206*b* and then store information obtained from signal processing of the fourth information/signal in the memory 204*b*. The memory 204*b* may be coupled with the processor 202*b* to store a variety of information related to operation of the processor 202*b*. For example, the memory 204*b* may store software code including instructions for performing all or some of the processes controlled by the processor 202*b* or performing the descriptions, functions, procedures, proposals, methods and/or operational flowcharts disclosed herein. Herein, the processor 202*b* and the memory 204*b* may be part of a communication modem/circuit/chip designed to implement wireless communication technology (e.g., LTE or NR). The transceiver 206*b* may be coupled with the processor 202*b* to transmit and/or receive radio signals through one or more antennas 208*b*. The transceiver 206*b* may include a transmitter and/or a receiver. The transceiver 206*b* may be used interchangeably with a radio frequency (RF) unit. In the present disclosure, the wireless device may refer to a communication modem/circuit/chip.

Hereinafter, hardware elements of the wireless devices 200*a* and 200*b* will be described in greater detail. Without being limited thereto, one or more protocol layers may be implemented by one or more processors 202*a* and 202*b*. For example, one or more processors 202*a* and 202*b* may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202*a* and 202*b* may generate one or more protocol data units (PDUs) and/or one or more service data unit (SDU) according to the descriptions, functions, procedures, proposals, methods and/or operational flowcharts disclosed herein. One or more processors 202*a* and 202*b* may generate messages, control information, data or information according to the descriptions, functions, procedures, proposals, methods and/or operational flowcharts disclosed herein. One or more processors 202*a* and 202*b* may generate PDUs, SDUs, messages, control information, data or information according to the functions, procedures, proposals and/or methods disclosed herein and provide the PDUs, SDUs, messages, control information, data or information to one or more transceivers 206*a* and 206*b*. One or more processors 202*a* and 202*b* may receive signals (e.g., baseband signals) from one or more transceivers 206*a* and 206*b* and acquire PDUs, SDUs, messages, control information, data or information according to the descriptions, functions, procedures, proposals, methods and/or operational flowcharts disclosed herein.

One or more processors 202*a* and 202*b* may be referred to as controllers, microcontrollers, microprocessors or microcomputers. One or more processors 202*a* and 202*b* may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202*a* and 202*b*. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202*a* and 202*b* or stored in one or more memories 204*a* and 204*b* to be driven by one or more processors 202*a* and 202*b*. The descriptions, functions, procedures, proposals, methods and/or operational flowcharts disclosed herein implemented using firmware or software in the form of code, a command and/or a set of commands.

One or more memories 204*a* and 204*b* may be coupled with one or more processors 202*a* and 202*b* to store various types of data, signals, messages, information, programs, code, instructions and/or commands. One or more memories 204*a* and 204*b* may be composed of read only memories (ROMs), random access memories (RAMs), erasable programmable read only memories (EPROMs), flash memories, hard drives, registers, cache memories, computer-readable storage mediums and/or combinations thereof. One or more memories 204*a* and 204*b* may be located inside and/or outside one or more processors 202*a* and 202*b*. In addition, one or more memories 204*a* and 204*b* may be coupled with one or more processors 202*a* and 202*b* through various technologies such as wired or wireless connection.

One or more transceivers 206*a* and 206*b* may transmit user data, control information, radio signals/channels, etc. described in the methods and/or operational flowcharts of the present disclosure to one or more other apparatuses. One or more transceivers 206*a* and 206*b* may receive user data, control information, radio signals/channels, etc. described in the methods and/or operational flowcharts of the present disclosure from one or more other apparatuses. For example, one or more transceivers 206a and 206b may be coupled with one or more processors 202a and 202b to transmit/receive radio signals. For example, one or more processors 202a and 202b may perform control such that one or more transceivers 206a and 206b transmit user data, control information or radio signals to one or more other apparatuses. In addition, one or more processors 202a and 202b may perform control such that one or more transceivers 206a and 206b receive user data, control information or radio signals from one or more other apparatuses. In addition, one or more transceivers 206a and 206b may be coupled with one or more antennas 208a and 208b, and one or more transceivers 206a and 206b may be configured to transmit/receive user data, control information, radio signals/channels, etc. described in the descriptions, functions, procedures, proposals, methods and/or operational flowcharts disclosed herein through one or more antennas 208a and 208b. In the present disclosure, one or more antennas may be a plurality of physical antennas or a plurality of logical antennas (e.g., antenna ports). One or more transceivers 206a and 206b may convert the received radio signals/channels, etc. from RF band signals to baseband signals, in order to process the received user data, control information, radio signals/channels, etc. using one or more processors 202a and 202b. One or more transceivers 206a and 206b may convert the user data, control information, radio signals/channels processed using one or more processors 202a and 202b from baseband signals into RF band signals. To this end, one or more transceivers 206a and 206b may include (analog) oscillator and/or filters.

Structure of Wireless Device Applicable to the Present Disclosure

FIG. 3 illustrates another example of a wireless device applicable to the present disclosure.

Referring to FIG. 3, a wireless device 300 may correspond to the wireless devices 200a and 200b of FIG. 2 and include various elements, components, units/portions and/or modules. For example, the wireless device 300 may include a communication unit 310, a control unit (controller) 320, a memory unit (memory) 330 and additional components 340. The communication unit may include a communication circuit 312 and a transceiver(s) 314. For example, the communication circuit 312 may include one or more processors 202a and 202b and/or one or more memories 204a and 204b of FIG. 2. For example, the transceiver(s) 314 may include one or more transceivers 206a and 206b and/or one or more antennas 208a and 208b of FIG. 2. The control unit 320 may be electrically coupled with the communication unit 310, the memory unit 330 and the additional components 340 to control overall operation of the wireless device. For example, the control unit 320 may control electrical/mechanical operation of the wireless device based on a program/code/instruction/information stored in the memory unit 330. In addition, the control unit 320 may transmit the information stored in the memory unit 330 to the outside (e.g., another communication device) through the wireless/wired interface using the communication unit 310 over a wireless/wired interface or store information received from the outside (e.g., another communication device) through the wireless/wired interface using the communication unit 310 in the memory unit 330.

The additional components 340 may be variously configured according to the types of the wireless devices. For example, the additional components 340 may include at least one of a power unit/battery, an input/output unit, a driving unit or a computing unit. Without being limited thereto, the wireless device 300 may be implemented in the form of the robot (FIG. 1, 100a), the vehicles (FIG. 1, 100b-1 and 100b-2), the XR device (FIG. 1, 100c), the hand-held device (FIG. 1, 100d), the home appliance (FIG. 1, 100e), the IoT device (FIG. 1, 100f), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 3, various elements, components, units/portions and/or modules in the wireless device 300 may be coupled with each other through wired interfaces or at least some thereof may be wirelessly coupled through the communication unit 310. For example, in the wireless device 300, the control unit 320 and the communication unit 310 may be coupled by wire, and the control unit 320 and the first unit (e.g., 130 or 140) may be wirelessly coupled through the communication unit 310. In addition, each element, component, unit/portion and/or module of the wireless device 300 may further include one or more elements. For example, the control unit 320 may be composed of a set of one or more processors. For example, the control unit 320 may be composed of a set of a communication control processor, an application processor, an electronic control unit (ECU), a graphic processing processor, a memory control processor, etc. In another example, the memory unit 330 may be composed of a random access memory (RAM), a dynamic RAM (DRAM), a read only memory (ROM), a flash memory, a volatile memory, a non-volatile memory and/or a combination thereof.

Figure 4:
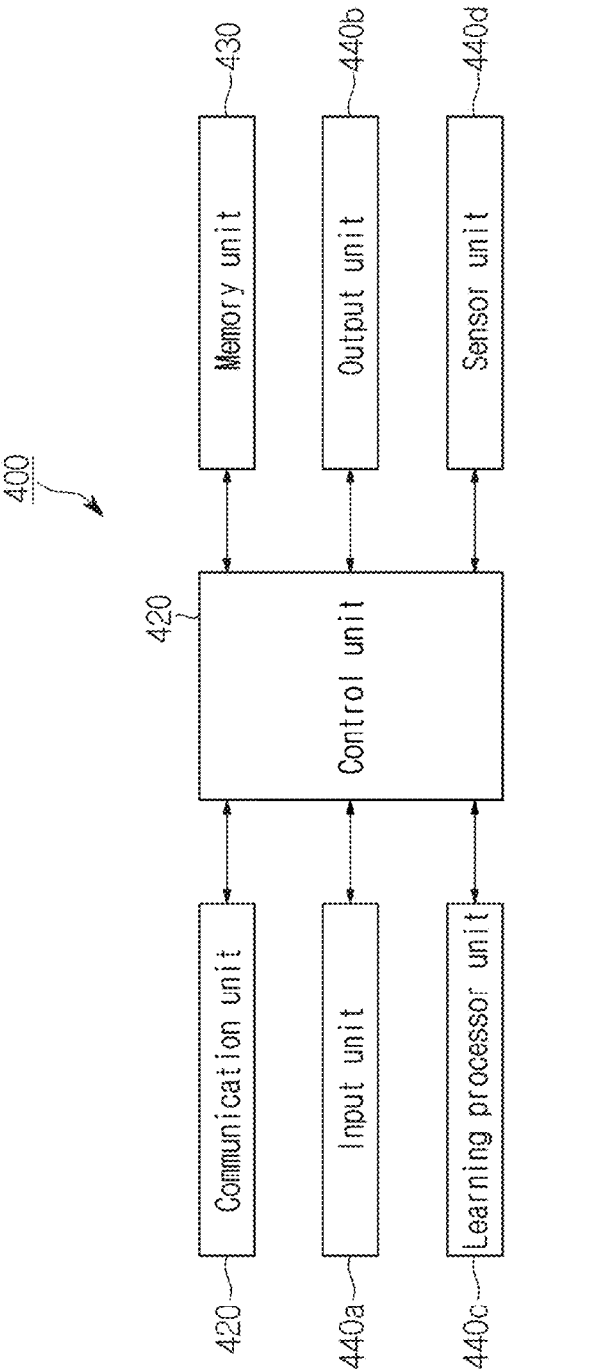
FIG. 4 illustrates an example of an AI device applied to the present disclosure.

FIG. 4 illustrates an example of an AI device applied to the present disclosure. For example, the AI device may be implemented as a fixed device or a movable device such as TV, projector, smartphone, PC, laptop, digital broadcasting terminal, tablet PC, wearable device, set-top box (STB), radio, washing machine, refrigerator, digital signage, robot, vehicle, etc.

Referring to FIG. 4, the AI device 400 may include a communication unit 410, a control unit 420, a memory unit 430, an input/output unit 440a/440b, a learning processor unit 440c and a sensor unit 440d. Blocks 410 to 430/440A to 440D may correspond to blocks 310 to 330/340 of FIG. 3, respectively.

The communication unit 410 may transmit and receive a wired and wireless signal (e.g., sensor information, user input, learning model, control signal, etc.) to and from external devices such as another AI device (e.g., 100x, 120, 140 in FIG. 1) or an AI server (140 in FIG. 1) using wired/wireless communication technology. To this end, the communication unit 410 may transmit information in the memory unit 430 to an external device or send a signal received from an external device to the memory unit 430.

The control unit 420 may determine at least one executable operation of the AI device 400 based on information determined or generated using a data analysis algorithm or machine learning algorithm. In addition, the control unit 420 may control the components of the AI device 400 to perform the determined operation. For example, the control unit 420 may request, search, receive, or utilize the data of the learning processor 440c or the memory unit 430, and control the components of the AI device 400 to perform predicted operation or operation determined to be preferred among at least one executable operation. In addition, the control unit 420 collects history information including a user's feedback on the operation content or operation of the AI device 400, and stores it in the memory unit 430 or the learning processor 440c or transmit it to an external device such as the AI server (140 in FIG. 1). The collected history information may be used to update a learning model.

The memory unit 430 may store data supporting various functions of the AI device 400. For example, the memory unit 430 may store data obtained from the input unit 440a, data obtained from the communication unit 410, output data of the learning processor unit 440c, and data obtained from the sensor unit 440. Also, the memory unit 430 may store control information and/or software code required for operation/execution of the control unit 420.

The input unit 440a may obtain various types of data from the outside of the AI device 400. For example, the input unit 420 may obtain learning data for model learning, input data to which the learning model is applied, etc. The input unit 440a may include a camera, a microphone and/or a user input unit, etc. The output unit 440b may generate audio, video or tactile output. The output unit 440b may include a display unit, a speaker and/or a haptic module. The sensor unit 440 may obtain at least one of internal information of the AI device 400, surrounding environment information of the AI device 400 or user information using various sensors. The sensor unit 440 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar.

The learning processor unit 440c may train a model composed of an artificial neural network using learning data. The learning processor unit 440c may perform AI processing together with the learning processor unit of the AI server (140 in FIG. 1). The learning processor unit 440c may process information received from an external device through the communication unit 410 and/or information stored in the memory unit 430. In addition, the output value of the learning processor unit 440c may be transmitted to an external device through the communication unit 410 and/or stored in the memory unit 430.

6G Communication System

A 6G (wireless communication) system has purposes such as (i) very high data rate per device, (ii) a very large number of connected devices, (iii) global connectivity. (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 1 shows the requirements of the 6G system.

TABLE 1

| | |
|---|---|
| Per device peak data rate | 1 Tbps |
| E2E latency | 1 ms |
| Maximum spectral efficiency | 100 bps/Hz |
| Mobility support | up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Artificial Intelligence (AI)

The most important and newly introduced technology for the 6G system is AI. AI was not involved in the 4G system. 5G systems will support partial or very limited AI. However, the 6G system will support AI for full automation. Advances in machine learning will create more intelligent networks for real-time communication in 6G. Introducing AI in communication may simplify and enhance real-time data transmission. AI may use a number of analytics to determine how complex target tasks are performed. In other words, AI may increase efficiency and reduce processing delay.

Time consuming tasks such as handover, network selection, and resource scheduling may be performed instantly by using AI. AI may also play an important role in machine-to-machine, machine-to-human and human-to-machine communication. In addition, AI may be a rapid communication in a brain computer interface (BCI). AI-based communication systems may be supported by metamaterials, intelligent structures, intelligent networks, intelligent devices, intelligent cognitive radios, self-sustained wireless networks, and machine learning.

Recently, attempts have been made to integrate AI with wireless communication systems, but application layers, network layers, and in particular, deep learning have been focused on the field of wireless resource management and allocation. However, such research is gradually developing into the MAC layer and the physical layer, and in particular, attempts to combine deep learning with wireless transmission are appearing in the physical layer. AI-based physical layer transmission means applying a signal processing and communication mechanism based on an AI driver rather than a traditional communication framework in fundamental signal processing and communication mechanisms. For example, deep learning-based channel coding and decoding, deep learning-based signal estimation and detection, deep learning-based multiple input multiple output (MIMO) mechanism, and AI-based resource scheduling and allocation may be included.

Machine learning may be used for channel estimation and channel tracking, and may be used for power allocation, interference cancellation, and the like in a downlink (DL) physical layer. Machine learning may also be used for antenna selection, power control, symbol detection, and the like in a MIMO system.

However, the application of DNN for transmission in the physical layer may have the following problems.

Deep learning-based AI algorithms require a lot of training data to optimize training parameters. However, due to limitations in obtaining data in a specific channel environment as training data, a lot of training data is used offline. This is because static training on training data in a specific channel environment may cause a contradiction between diversity and dynamic characteristics of a radio channel.

In addition, current deep learning mainly targets real signals. However, the signals of the physical layer of wireless communication are complex signals. In order to match the characteristics of a wireless communication signal, additional research on a neural network that detects a complex domain signal is required.

Hereinafter, machine learning will be described in greater detail.

Machine learning refers to a series of operations for training a machine to create a machine capable of performing a task which can be performed or is difficult to be performed by a person. Machine learning requires data and a learning model. In machine learning, data learning methods may be largely classified into three types: supervised learning, unsupervised learning, and reinforcement learning.

Neural network learning is to minimize errors in output. Neural network learning is a process of updating the weight of each node in the neural network by repeatedly inputting learning data to a neural network, calculating the output of the neural network for the learning data and the error of the target, and backpropagating the error of the neural network from the output layer of the neural network to the input layer in a direction to reduce the error.

Supervised learning uses learning data labeled with correct answers in the learning data, and unsupervised learning may not have correct answers labeled with the learning data. That is, for example, learning data in the case of supervised learning related to data classification may be data in which each learning data is labeled with a category. Labeled learning data is input to the neural network, and an error may be calculated by comparing the output (category) of the neural network and the label of the learning data. The calculated error is backpropagated in a reverse direction (i.e., from the output layer to the input layer) in the neural network, and the connection weight of each node of each layer of the neural network may be updated according to backpropagation. The amount of change in the connection weight of each updated node may be determined according to a learning rate. The neural network's computation of input data and backpropagation of errors may constitute a learning cycle (epoch). The learning rate may be applied differently according to the number of iterations of the learning cycle of the neural network. For example, in the early stages of neural network learning, a high learning rate is used to allow the neural network to quickly achieve a certain level of performance to increase efficiency, and in the late stage of learning, a low learning rate may be used to increase accuracy.

A learning method may vary according to characteristics of data. For example, when the purpose is to accurately predict data transmitted from a transmitter in a communication system by a receiver, it is preferable to perform learning using supervised learning rather than unsupervised learning or reinforcement learning.

The learning model corresponds to the human brain, and although the most basic linear model may be considered, a paradigm of machine learning that uses a neural network structure with high complexity such as artificial neural networks as a learning model is referred to as deep learning.

The neural network cord used in the learning method is largely classified into deep neural networks (DNN), convolutional deep neural networks (CNN), and recurrent Boltzmann machine (RNN), and this learning model may be applied.

Hereinafter will be described a method for controlling a radio channel environment by using a reconfigurable intelligent surface (RIS). In addition, the RIS may be an intelligent reflect surface (IRS). That is, there may be various forms of RISs, and the present disclosure may not be limited to a specific term. Hereinafter, for convenience of explanation, the description will be mainly use RIS but may not be limited thereto. Herein, an artificial intelligence (AI) system may be used to control a radio channel environment using a RIS, which will also be described below.

As an example, the current wireless communication technology may be controlled through endpoint optimization that adapts to a channel environment H. As an example, when optimization is performed in a transmitter and a receiver, the transmitter and the receiver may improve transfer efficiency by adjusting at least any one of beamforming, power control, and adaptive modulation according to the channel environment H between the transmitter and the receiver.

At this time, the channel environment may be random, not controlled, and in a naturally fixed state. That is, in an existing communication system, a channel environment has a fixed state, and each endpoint may be controlled to be optimized to the channel environment. Accordingly, a transmitter and a receiver have no choice but to perform optimization to adapt to a channel and thus transmit and receive data. Herein, in a non-line of sight (NLOS) environment of a shadow area or in an environment which has a large signal loss and hardly has multiple paths, such as 6G THz, the optimization of endpoints may not overcome the Shannon's capacity limit, and a throughput thus obtained may hardly satisfy an expected requirement.

In consideration of what is described above, in a new communication system, communication may be performed based on a smart radio environment. Herein, in the smart radio environment, a RIS may be used as a factor capable of controlling a radio channel like a transceiver.

That is, a factor for a radio channel may be added as an available factor for optimizing wireless communication transmission. Thus, channel reconfiguration or Shannon's capacity limit, which are insoluble problems of the existing communication system, may be overcome. However, it is necessary to measure a channel added by a RIS in a smart radio environment and to perform optimization in simultaneous consideration of the RIS together with a transceiver, and an optimization process may become complicated.

As an example, along with the current limitations of wireless communication technology, an alternating optimization (AO) algorithm applied in a smart radio environment may have limitations on controlling a RIS.

More specifically, an existing communication system may be operated by approaching Shannon's capacity limit through the control of a transmitter and a receiver in a fixed radio channel environment. However, in a poor NLOS environment like a shadow area, transmission and reception may be actually impossible because of channel capacity limit. As an example, in a NLOS environment, a transmitter may improve the channel capacity limit by increasing power, but the magnitude of noise and interference may also increase to that extent. Herein, in an environment that has a large signal loss and hardly has multiple paths, optimization of a transmitter and a receiver alone may have limitations on overcoming Shannon's capacity limit.

Herein, as an example, a new communication system (e.g. 6G) may need to satisfy requirements for providing new services such as MBRLLC (Mobile Broadband Reliable Low Latency Communication), mURLLC (Massive Ultra-Reliable, Low Latency communications), HCS(Human-Centric Services), and 3CLS (Convergence of Communications, Computing, Control, Localization, and Sensing), and to this end, communication based on a smart radio environment may be needed.

In addition, as an example, a lot of relays are being used to increase the cell coverage of a base station and to support a shadow area. However, although using relays may improve transmission efficiency, an additional interference signal may occur to other users. Accordingly, there may be a limitation on overall efficiency of communication resources. In addition, a high additional cost and energy are required to use relays, and complex and mixed interference signals may not be easy to manage. In addition, as an example, spectrum efficiency may be reduced by using a half-duplex scheme, and this may affect space usage and aesthetics.

On the other hand, in a smart radio environment, a radio channel environment may be controlled by using a RIS. At the same time, a transmitter and a receiver may perform optimization together to provide a solution to overcoming Shannon's capacity limit in a smart radio environment, which will be described below.

However, apart from an existing channel between a base station and a terminal, a base station-RIS channel and a RIS-terminal channel also need to be considered. In addition, optimization of a transceiver is sufficient in an existing environment, but a smart radio environment requires to control a RIS together.

In addition, a corresponding value may have dependency on optimization of a transceiver, and complexity may increase accordingly. Herein, an alternating optimization (AO) algorithm used for optimization may be iteratively implemented until convergence and cause a burden of measuring every channel. In consideration of what is described above, hereinafter will be described a method for performing optimization by a reconfigurable intelligence surface (RIS) in a smart radio environment and an artificial intelligence (AI) system.

In addition, as an example, Table 2 may present terms that consider what is described above and will be described below, and based on this, hereinafter will be a method for performing optimization by a RIS in a smart radio environment and an AI system.

TABLE 2

Federated learning
Reconfigurable intelligent surface (RIS)
Intelligent reflect surface (IRS)
Smart radio environment
Mobile broadband reliable low latency communication (MBRLLC): 6 G service requiring high speed, high reliability and low latency (e.g. BCI)
Massive machine type communication (mMTC)
Massive ultra-reliable, low latency communications (mURLLC): mMTC + URLLC
Quality-of-physical-experience (QoPE): QOS + QOE + physiological reaction
Human-centric services (HCS): communication based on QoPE
Convergence of communications, computing, control, localization, and sensing (3CLS)

Figure 5:
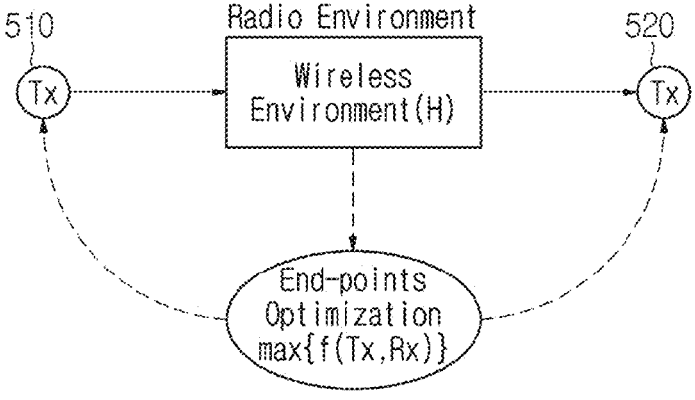
FIG. 5 is a view showing a radio channel environment according to an embodiment of the present disclosure.

FIG. 5 is a view showing a radio channel environment according to an embodiment of the present disclosure. Referring to FIG. 5, in an existing communication system, a radio channel environment H may be naturally fixed and be an uncontrollable random state. Accordingly, a transmitter 510 and a receiver 520 may find an optimized transmitting and receiving method that is adaptive to a channel. The transmitter 510 and the receiver 520 may be controlled to measure a channel state through a signal (e.g. reference signal) and perform optimization based on the measured channel state. However, as described above, there may be a limitation of data transfer in a case with a large signal loss and having a difficulty in applying multiple paths, such as THz environment, and a NLOS environment such as a shadow area. As an example, Equation 1 below may show Shannon's capacity limit. Herein, even when augmenting a transmission signal P by applying precoding and processing in Equation 1, if the channel |H| has a small size, there may be a limitation in increasing a channel capacity.

In a fixed state of radio channel environment, there may be a limitation in increasing a channel capacity based on Equation 1. Herein, multiple paths between the transmitter 510 and the receiver 520 may be secured by using a RIS, and thus the above-described channel |H| may be increased. That is, in a smart radio environment, a radio channel environment based on a RIS may be a controllable factor, and thus the channel capacity may be increased.

$$C = \log\left(1 + \frac{|HP|^2}{\sigma^2}\right) \qquad \text{[Equation 1]}$$

Figure 6:
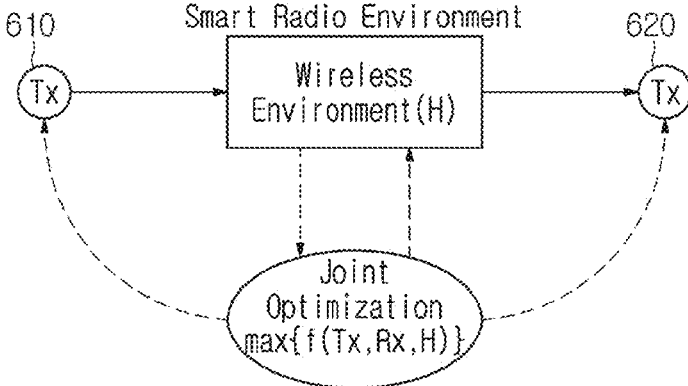
FIG. 6 is a view showing a smart radio environment according to an embodiment of the present disclosure.

As an example, FIG. 6 is a view showing a smart radio environment according to an embodiment of the present disclosure. Referring to FIG. 6, a wireless channel |H| in a smart radio channel may be a factor for optimization. More specifically, in FIG. 5 described above, as endpoint optimization, optimization may be performed in a transmitter 610 and a receiver 620 based on "max {f(Tx, Rx)}", and this is the same as described above. However, in FIG. 6, as endpoint optimization, optimization may be performed in the transmitter 610 and the receiver 620 based on "max {f(Tx, Rx, H)}". That is, in a smart radio environment, the channel |H| may be used based on a RIS as a factor for optimization.

Figure 7:
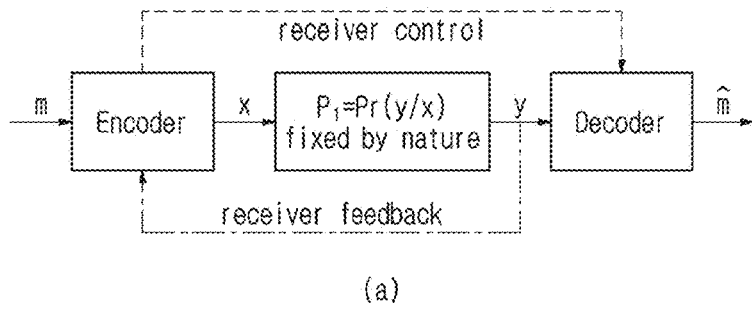
FIG. 7 is a view showing an existing radio channel environment and a smart radio environment according to an embodiment of the present disclosure.
Figure 7:
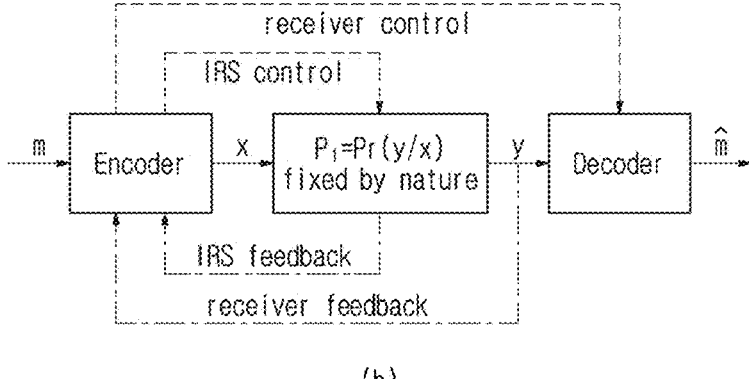

FIG. 7 is a view showing an existing radio channel environment and a smart radio environment according to an embodiment of the present disclosure. As an example, referring to (a) of FIG. 7, the existing radio channel environment may be P1. In addition, referring to (b) of FIG. 7, the smart radio environment may be P2. Herein, in (a) of FIG. 7 and (b) of FIG. 7, when a signal x is transmitted from a transmitter through a wireless channel, a receiver may receive a signal y. Herein, in the existing radio channel environment, a probability of P1 may be fixed, the receiver (decoder) may transmit feedback to the transmitter through measurement for a transmission signal. The transmitter may perform optimization to adapt to a radio channel environment through the feedback of the receiver. As a more concrete example, a receiver may measure a channel quality indicator (CQI) for a transmission signal based on a reference signal transmitted from a transmitter and give feedback thereon. The transmitter may control a modulation coding scheme (MCS) based on the feedback information and provide information on it, thereby performing communication.

On the other hand, referring to (b) of FIG. 7, in a smart radio environment, a radio channel environment P2 is recognized, and the radio channel environment may be modified through RIS control. At the same time, a receiver may measure a received transmission signal and transmit feedback on it to a transmitter. That is, the transmitter may receive feedback information based on RIS control and feedback information of the receiver and perform optimization. Herein, the transmitter may modify a radio channel environment by controlling a RIS, and optimization may be performed by considering the radio channel environment and the transmitter.

Figure 8:
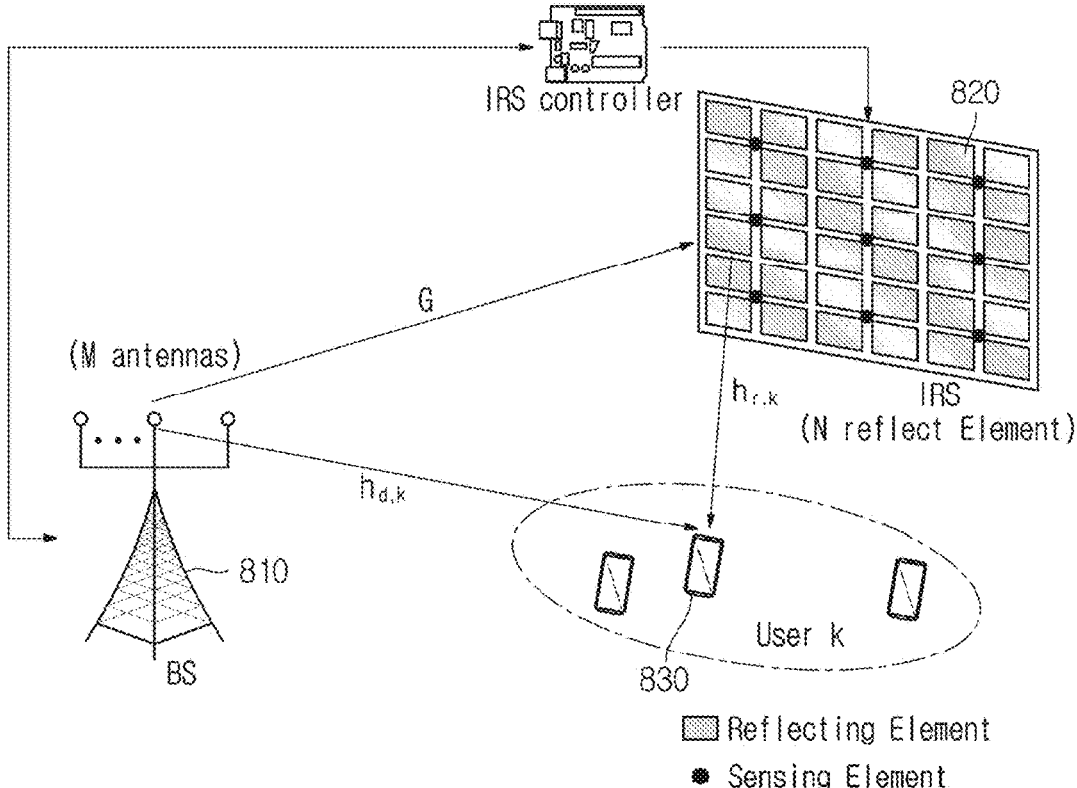
FIG. 8 is a view showing a method for performing optimization in a smart radio environment according to an embodiment of the present disclosure.
Figure 9:
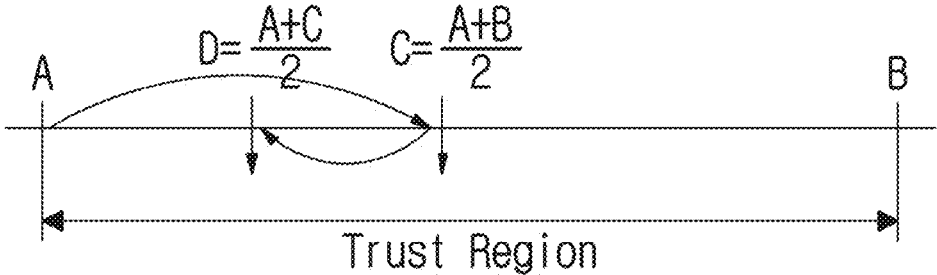
FIG. 9 is a view showing a trust region according to an embodiment of the present disclosure.

More specifically, FIG. 8 is a view showing a method for performing optimization in a smart radio environment according to an embodiment of the present disclosure. Referring to FIG. 8, in a smart radio environment, there may be a RIS 820 between a base station 810 and a terminal 830. As an example, there may be a path, in which a signal transmitted by the base station 810 is directly transmitted to the terminal 830, and a path in which the signal is transmitted by reflecting from the RIS 820. That is, a smart radio environment may have a wireless channel G between the base station 810 and the RIS 820, a wireless channel $h_{r,k}$ between the RIS 820 and the terminal 830, and a direct wireless channel $h_{d,k}$ between the base station 810 and the terminal 830. Herein, based on control of the RIS 820, the wireless channel G between the base station 810 and the RIS 820 and the wireless channel $h_{r,k}$ between the RIS 820 and the terminal 830 may be modified. Accordingly, optimization in a smart radio environment may be performed by considering the above-described radio channel environment.

More specifically, in case the base station 810 transmits a signal to the terminal k 830, a base station transmits beamforming vector for the terminal k 830 may be $w_k$, the signal transmitted to the terminal k 830 may be $s_k$, and a reception noise may be $n_k$. Herein, a signal, which the terminal k 830 receives from the base station 810 based on an environment using the RIS 820, may be represented by Equation 2 below, and each channel may be shown in Table 3.

$$y = (h_{r,k}\Phi G + h_{d,k})w_k s_k + n_k \qquad \text{[Equation 2]}$$

TABLE 3

$h_{d,k} \in \mathbb{C}^{1 \times M}$: Channel from BS to user k, $h_{r,k} \in \mathbb{C}^{1 \times N}$; Channel from IRS to user k
$G \in \mathbb{C}^{N \times M}$: Channel from BS to IRS, $w_k \in \mathbb{C}^{M \times 1}$; transmit beamforming vector for signal $s_k$
$\Phi = \text{diag}(\beta 1 e^{j\Theta 1} \ldots \beta N e^{j\Theta N})$: Phase and amplitude coefficient for element n, $\beta \in [0, 1]$, $\beta \in [0, 2\pi]$ $n_k \sim C\mathcal{N}(0, \sigma_k^2)$: AWGN at user k Here, a signal noise ratio (SNR) received by the terminal k 830 may be represented by Equation 3 below.

$$\gamma = \frac{(h_{r,k}\Phi G + h_{d,k})w_k}{\sigma_k^2} \qquad \text{[Equation 3]}$$

Accordingly, when an SRE for optimizing a received SNR is constructed, it may be a case of setting control of an IRS and transmit beamforming, as shown in Equation 4 below.

$$\max_{w_k, \Phi} \frac{|(h_{r,k}\Phi G + h_{d,k})w_k|^2}{\sigma_k^2} \qquad \text{[Equation 4]}$$

Here, considering maximum-rate transmit in MIMO, transmit beamforming $w_k$ of the terminal k 1230 may be represented by Equation 5 below.

$$w_k^* = \sqrt{P_{max}} \frac{(h_{r,k}\Phi G + h_{d,k})^H}{\|(h_{r,k}\Phi G + h_{d,k})\|} \qquad \text{[Equation 5]}$$

Here, $P_{max}$ may be a maximum transmission power in an IRS, and if $$w_k^*$$

is put into an equation maximizing $w_k$ and $\Phi$, optimization may be represented by Equation 6 below.

$$\max_{\Phi} \|h_{r,k}\Phi G + h_{d,k}\|^2, \text{ s.t. } |\Phi_{i,i}| = 1, \forall i = 1, 2, 3, \ldots, N \qquad \text{[Equation 6]}$$

*186 Herein, when the IRS control value $\Phi$ is determined, $w_k^*$ may be determined by an operation. Herein, an alternating optimization (AO) algorithm may be used to solve the above-described optimization problem. As an example, the AO algorithm may be a method of determining a trust region for each IRS element by using channel information ($h_d$, $h_r$, G), as shown in FIG. 13. In addition, a binary decision may be made iteratively until values of an objective function (objective values) converge, and thus $\theta_n$ may be obtained. Herein, when an upper bound of a convergence value is an ideal IRS, $\beta_n(\theta_n)$ may be equal to 1. Herein, as an example, in FIG. 12, an IRS may repeat the above-descried operation in order to find an optimized value for each IRS element described above.

Herein, the AO algorithm needs to be repeated until convergence. In addition, as an optimized value should be derived for each IRS element, complexity may increase and a computational quantity may increase. Herein, the complexity and the computational quantity may be increase according to the number N of antennas and the number of IRS elements in a base station, and there may be a limitation in calculating them. In addition, when the AO algorithm is optimized, measured values of all the channels including IRSs may be needed, and considering what is described above, there may be a limitation on optimization.

A wireless communication technology tries to approach Shannon's capacity limit through optimized control of a transceiver, as described above. However, in a poor NLOS environment such as a shadow area, transmission and reception may be almost impossible due to channel capacity limit. As an example, a channel environment may be improved through improved power of a transmitter and MIMO technology, but a channel environment with a large signal loss may have a limitation. Especially, a 6G THz environment may have a larger signal loss because a high frequency band is used. Because multiple paths are hard to exist in the 6G THz environment, a method of optimizing a transceiver may hardly overcome Shannon's capacity limit.

Accordingly, in order to provide a new wireless communication system (e.g. 6G service (MBRLLC, mURLLC, HCS, 3CLS), a technique of optimizing a communication environment to be suitable for such a service may also be needed. As an example, a relay may be used to increase the coverage of a base station cell and to support a shadow area. Although a cell coverage may be expanded through a relay and a shadow area may be partially covered, an interference signal on another user may be additionally generated. Accordingly, even communication using a relay may have limited overall efficiency of communication resource. As another example, a relay may require a high additional cost and energy, and a lot of effort may be required to manage complicated and mixed interference signals.

In consideration of what is described above, a method of controlling a radio channel environment using not a relay but a reconfigurable intelligent surface (RIS) may be needed, and this will be described below. In addition, in a smart radio environment that optimizes a transceiver through a RIS, a method for overcoming Shannon's capacity limit may be proposed, and hereinafter, a technique for O2I communication based on an RIS will be described.

Figure 10:
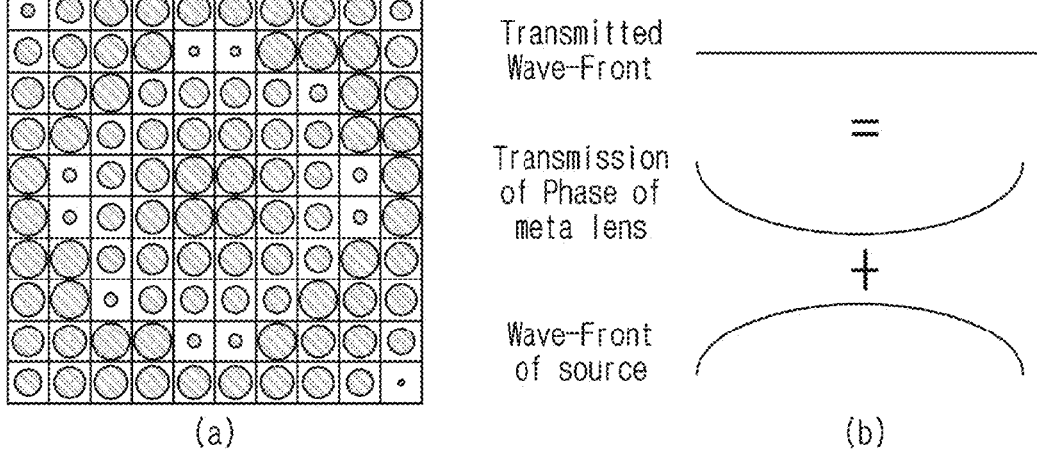
FIG. 10 is a view showing a method for controlling a signal based on a meta lens according to an embodiment of the present disclosure.

In addition, as an example, FIG. 10 is a view showing a meta lens technology according to an embodiment of the present disclosure. Referring to FIG. 10, lenses may be composed of glass or a material similar to glass. Herein, because the glass of the lenses should be smoothly polished into an accurate curved surface to clearly collect light and obtain a more accurate and distinct image, the lenses may be configured based on the above-described material. However, polishing into the curved surface may be costly, and the feature of the curved surface is fixed when a lens is fabricated, there may be a lot of limitations in space. Herein, as an example, a meta lens may be a technology of implementing a similar feature to a glass lens by using a meta surface. Herein, a focal distance of an image may be adjusted in various ways through the meta lens. As an example, referring to (a) of FIG. 10, a meta lens may make a surface of a matter an artificial structure with a small and precise pattern and change a distance or location of a focus by adjusting a reflective index (equation of permittivity and magnetic permeability) in each element. As an example, (a) of FIG. 10 may be a fixed meta lens structure implemented as a phase gradient meta surface (PGMS), but the meta lens structure may not be limited thereto. As an example, a meta lens may control directionality of light by modifying a spherical wave to a plane wave.

More specifically, referring to (b) of FIG. 10, directionality of light may be given by changing a spherical wave to a plane wave through a meta lens. Herein, referring to (b) of FIG. 10, a wave front, which is transferred by combining a wave front of the spherical wave and phase shift of the meta lens, may have a form of plane wave and may not be limited thereto.

That is, a meta lens may change a focal distance and other image features by controlling parameters of each element, unlike existing fixed lenses, and hereinafter will be a method of performing O2I communication by applying the above-described meta lens technology.

Figure 11:
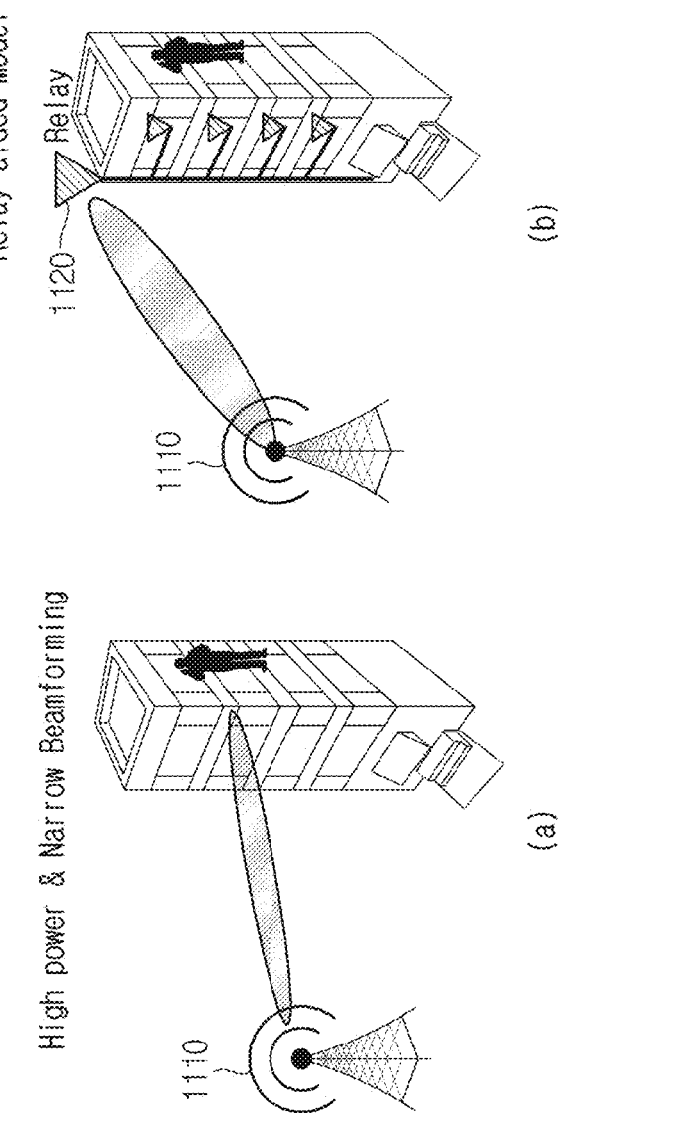
FIG. 11 is a view showing an O2I environment according to an embodiment of the present disclosure.

As an example, FIG. 11 is a view showing an O2I environment according to an embodiment of the present disclosure. Referring to FIG. 11, O2I communication method may be a high power & narrow beamforming technique and a relay aided model but may not be limited thereto.

Referring to (a) of FIG. 11, the high power & narrow beamforming technique may transfer a signal from outdoor to indoor through a beamforming signal with high power and a narrow beam width. On the other hand, in the relay aided model, a base station 1110 and a relay 1120 perform direct communication, and the relay may be connected to antennas of each floor through a conductor with small loss or an optical cable. Thus, the relay may transfer a signal to an indoor space, but an additional installation cost and a maintenance cost may occur to using the above-described method.

Figure 12:
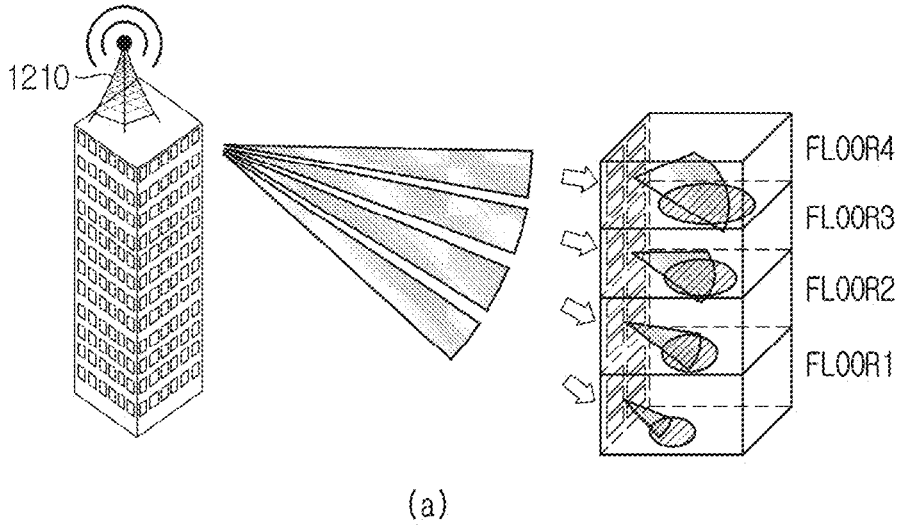
FIG. 12 is a view showing a method for covering a shadow area in a building in O2I communication according to an embodiment of the present disclosure.
Figure 12:
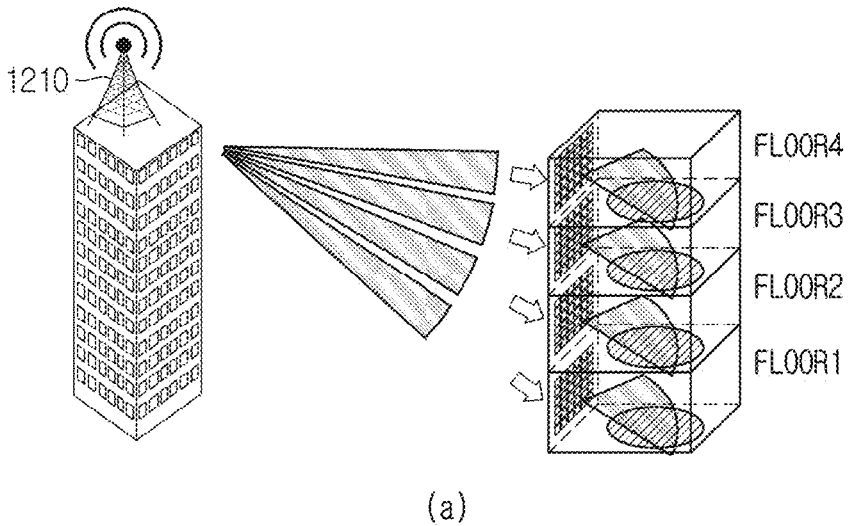
Figure 13:
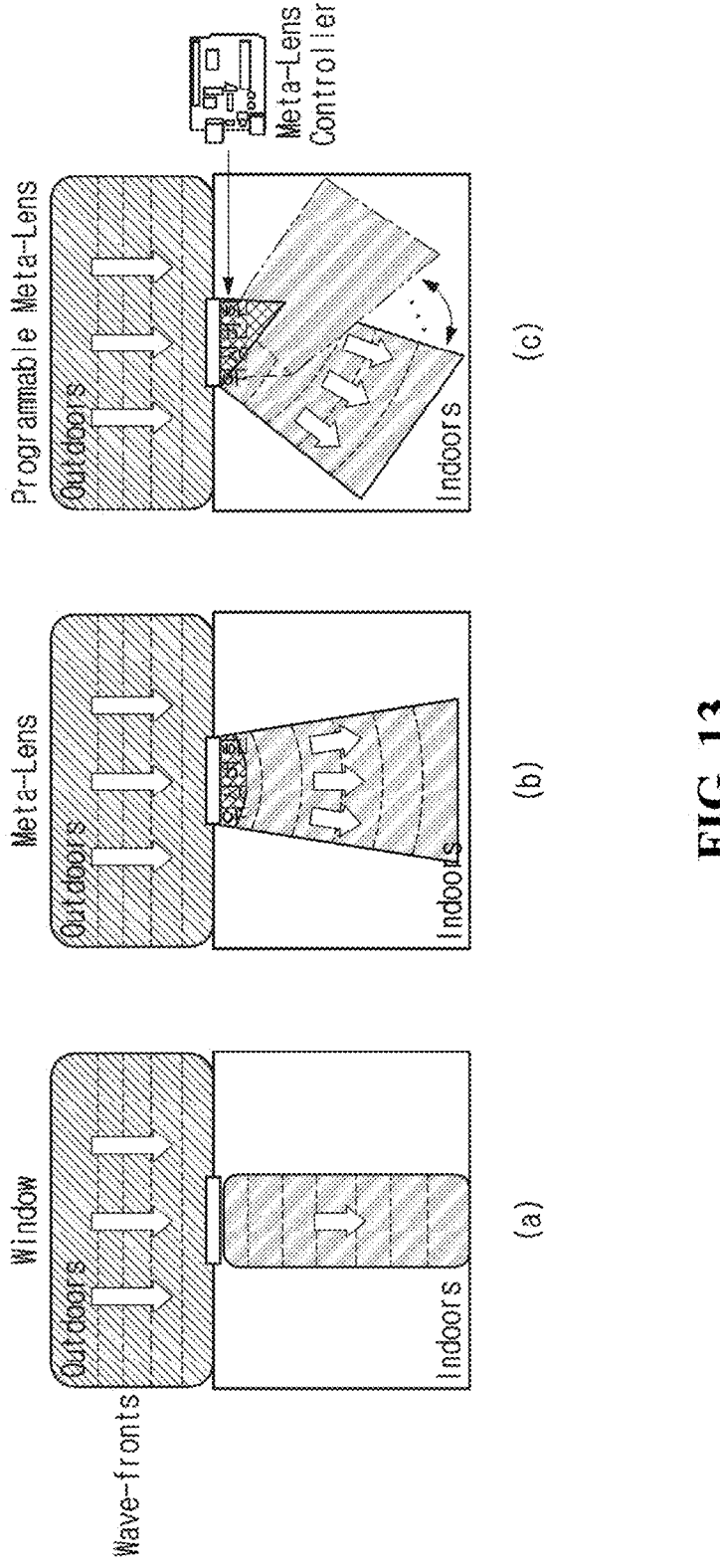
FIG. 13 is a view showing a radio wave traveling direction in O2I communication based on a meta material of a building window according to an embodiment of the present disclosure.

Herein, FIG. 12 is a view showing a method for covering a shadow area in a building in O2I communication according to an embodiment of the present disclosure. A meta lens technology may be applied to a building window. That is, by applying the above-described meta lens technology, the cost of installing and maintaining an additional relay may be reduced, and a shadow area in the building may be covered. In addition, as an example, AI learning may be performed through at least one of a base station 1210, a positional feature of a meta lens, and a structural feature of a building. Specifically, it is possible to consider a case of applying the meta lens technology to a window. That is, a window may be a RIS to which the meta lens technology is applied, and an optimized RIS control value may be generated through the above-described learning in order to perform communication. This will be described below. As an example, AI learning may generate an optimized RIS control value without being influenced by a number M of antennas of the base station 120 and a number N of RIS elements.

Herein, referring to (a) of FIG. 12, a shadow area may be different according to an inner-structural feature of a building.

As an example, in case a base station exists higher than a building where a terminal is present, a high floor of the building may have a smaller shadow area because of straightness, while a low floor of the building may have a large shadow area. That is, inside the building, each floor may have a different shadow area. As an example, because directions of radio waves coming from the base station are different according to each floor of the building, each floor may have a different shadow area. As an example, a relay may be used to solve the above-described problem, but the installation and maintenance of the relay may give rise to a cost. In consideration of what is described above, referring to (b) of FIG. 12, a meta lens may be applied to a building window to cover a shadow area. As an example, the meta lens may be controlled to enable O2I communication to be smoothly performed by being steered to a direction of a signal received from a base station.

As a concrete example, FIG. 13 is a view showing a radio wave traveling direction in O2I communication based on a meta material of a building window according to an embodiment of the present disclosure. Referring to (a) of FIG. 13, an existing window, which is a building window, may transfer a signal formed in a plane wave because of straightness of radio wave. Accordingly, a shadow area may be generated in a region of an indoor environment where the signal does not reach. In addition, referring to (b) of FIG. 13, a building window may be configured as a fixed-type meta lens. Herein, the meta lens may change a plane wave to a spherical wave based on what is described above. Accordingly, as compared with (a) of FIG. 13, a signal in the spherical wave form may be transferred to a wider area. That is, as compared with (a) of FIG. 13, (b) of FIG. 13 may have a reduced shadow area. However, as the fixed-type meta lens is capable of generating a preset form of spherical wave, there may be a limitation.

On the other hand, referring to (c) of FIG. 13, a programmable meta lens, of which a feature may be dynamically controlled through a meta lens controller, may be installed on a building window. As an example, the programmable meta lens may have various features. A feature of the metal lens may be at least any one of steerability and rotary curvature but is not limited to the above-described example. That is, a meta lens installed on a building window may dynamically change its feature through a metal lens controller, thereby covering various forms of shadow areas. As a new radio communication system (e.g. 6G THz) environment has much signal attenuation due to multiple paths, O2I may make better of a meta lens.

Figure 14:
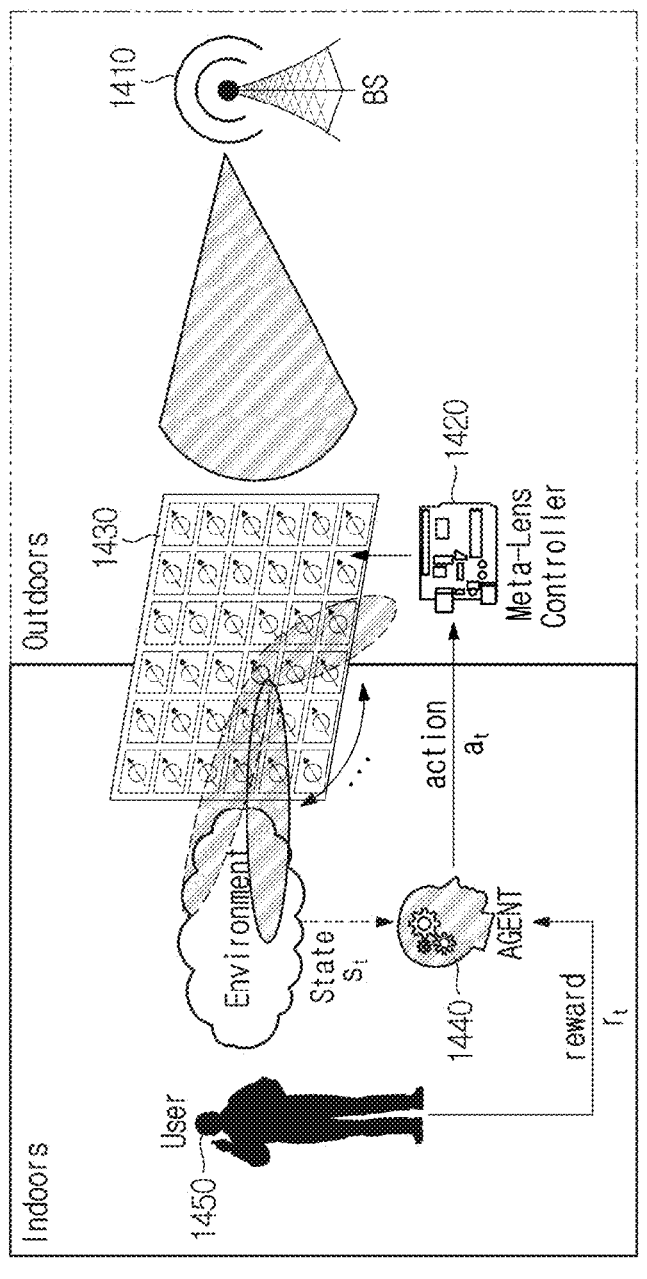
FIG. 14 is a view showing an O2I radio communication environment using a meta lens according to an embodiment of the present disclosure.

Herein, as an example, FIG. 14 is a view showing an O2I radio communication environment using a meta lens according to an embodiment of the present disclosure. Referring to FIG. 14, in O2I communication, the above-described features of a meta lens may be controlled by a meta lens controller 1420. Herein, the meta lens may be configured as a reconfigurable intelligent surface (RIS) 1430 described above, and the meta lens controller 1420 may adjust a feature by controlling a value for each element. That is, the RIS 1430 may change a plane wave to a spherical wave based on a meta lens configured in each element and enable communication to be performed in an indoor environment through beam adjustment based on steerability and rotary curvature change.

Hereinafter, for convenience of explanation, as for RIS, the description below will focus on the RIS 1430, where a meta lens is configured, but the RIS 1430 described below may be a RIS based on a meta lens.

As an example, channel estimation may be needed between the base station 1410 and the RIS 1430. After the channel estimation, transmit beamforming $w_{RIS}$ may be configured between the base station 1410 and the RIS 1430. Thus, an optimal communication environment may be configured between the base station 1410 and the RIS 1430. Then, an agent (or metal lens beam selector) 1440 may select a beam optimized for a terminal (or user) 1450. As an example, the agent 1440 may select an optimized beam based on a beam sweeping scheme or an AI system. In case a beam is optimized based on beam sweeping or an AI system, the agent 1440 may measure a channel of the terminal 1450 by using a reference signal of the base station 1410, to which $w_{RIS}$ is applied, and select a beam of a meta lens based on it. As an example, in case of reinforcement learning by an AI system, the agent 1440 may perform faster and more efficient search by learning a reward according to meta lens beam selection (action). A state of reinforcement learning may be determined through position measurement information through a sensor based on information obtained from an environment or a received SNR, terminal channel information, and other information. Then, the agent (or meta lens beam selector) 1440 may set a beam by transferring a control value to a meta lens controller.

In addition, as an example, a channel G between a base station and a BIS may be a channel without a position change in a line of sight (LoS) environment. That is, because a RIS is configured through a window within a building located in a specific place, the channel G between a base station and a RIS may be a channel without a position change. Accordingly, the channel G between a base station and a RIS may not have to be measured in O2I communication to determine transmit beamforming $w_{RIS}$. As an example, when a RIS is installed on a window of a building, if an estimated or measured value is not valid based on an environmental change, measurement of transmit beamforming $w_{RIS}$ may be performed.

In addition, as an example, a method of estimating the channel G between a base station and a RIS may be implemented through a meta lens with an active sensor function. As another example, the channel G between a base station and a RIS may be indirectly estimated through a terminal based on meta lens control and may not be limited to a specific embodiment.

Herein, as an example, in case the channel G between a base station and a RIS is directly estimated through a meta lens with an active sensor, the base station may transmit a reference signal $RS_{BS-RIS}$ to the RIS. The RIS may perform measurement based on the reference signal received from the base station and transfer it to the base station. Based on the measurement information obtained from the RIS, the base station may calculate the transmit beamforming $w_{RIS}$. As an example, $w_{RIS}$ may be calculated by Equation 7 below but may not be limited thereto.

$$w_{RIS}^* = \sqrt{P_{max}} \frac{G^H}{\|G\|} \qquad \text{[Equation 7]}$$

As another example, transmit beamforming $w_{RIS}$ may beset based on channel status information (CSI) feedback based on beam sweeping of a base station. As an example, a RIS may receive a reference signal that is transmitted from a base station based on beam sweeping and thus transfer measurement information as CIS feedback to the base station. Herein, the base station may set transmit beamforming $w_{RIS}$ based on the CSI feedback information.

As another example, transmit beamforming $w_{RIS}$ may be measured by a measuring equipment during initial installation. As another example, transmit beamforming $w_{RIS}$ may be periodically measured by a device with mobility (e.g. drone) or a low-power/low-cost sensor but is not limited to a specific embodiment.

As another example, as described above, transmit beamforming $w_{RIS}$ may also be indirectly estimated in a terminal through control of a meta lens. As an example, in case a terminal estimates a channel between a base station and a RIS, there may be two signal directions with the RIS at the center, that is, a direction of the base station and a direction of the terminal. As an example, transmit beamforming $w_{RIS}$ may be obtained through a method of finding a beam direction from the base station to the RIS with the direction of the terminal being fixed.

Herein, the direction of the terminal may be fixed based on an initial recognition mode of the meta lens. The initial recognition mode may be used not only to support a terminal of a specific direction but also to support terminals of every direction simultaneously. As an example, the initial recognition mode of the meta lens may be an operation of converting a plane wave to a spherical wave. The meta lens may propagate a signal in every direction in a building by converting a plane wave to a spherical wave, and a terminal may obtain a signal that is converted to the spherical wave.

Figure 15:
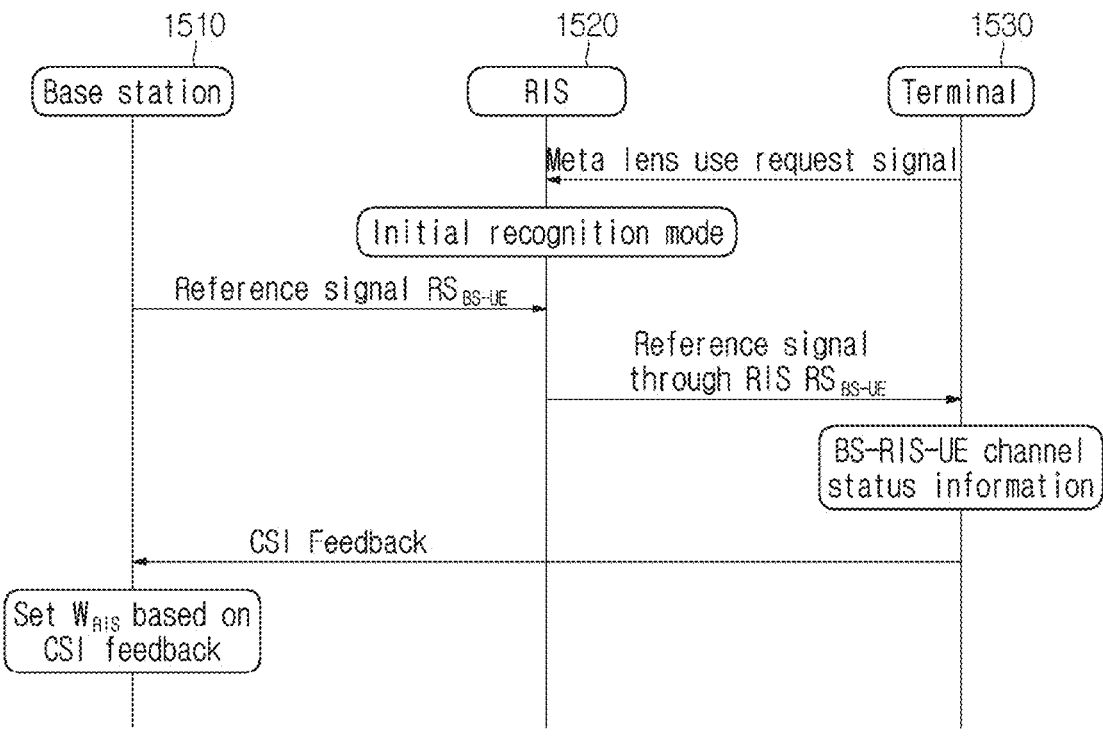
FIG. 15 is a view showing a method for measuring transmit beamforming of a base station through CSI feedback of a terminal based on an initial recognition mode of a meta lens according to an embodiment of the present disclosure.

As a concrete example, FIG. 15 is a view showing a method for measuring transmit beamforming of a base station through CSI feedback of a terminal based on an initial recognition mode of a meta lens according to an embodiment of the present disclosure. Referring to FIG. 15, a terminal 1530 may transmit a meta lens use request signal to a RIS (meta lens) 1520. Herein, based on the use request signal of the terminal 1530, the RIS 1520 may set an initial recognition mode that propagates a radio wave entering the RIS 1520 in every direction. That is, the RIS 1520 may convert a plane wave to a spherical wave based on a radio wave entering through a meta lens. Herein, the base station 1510 may transmit a reference signal $RS_{BS-UE}$, and the reference signal $RS_{BS-UE}$ UE may be transferred to the terminal 1530 through the RIS 1520. Herein, the terminal 1530 may generate channel status information based on the received reference signal $RS_{BS-UE}$ and transfer the information the terminal 1510 through CSI feedback. The base station 1510 may set transmit beamforming $W_{R\,IS}$ based on the received CSI feedback.

As another example, the base station 1510 may transfer a reference signal to the terminal 1530 based on beam sweeping, and the terminal 1530 may calculate a precoding matrix index (PMI) based on the reference signal and give feedback to the base station 1510. The base station 1510 may determine transmit beamforming $w_{RIS}$ through the PM obtained from the terminal 1530 and is not limited to a specific embodiment.

In addition, as an example, in case a plane wave is changed to a spherical wave based on a meta lens, the meta lens may set a control value differently according to an incidence direction of the plane wave. Herein, the control value may be expressed as $\Delta(FP_x, FP_y)$ but is not limited to a specific embodiment. Here, $FP_x$ may be a focal position of x-axis, and $FP_y$ may be a focal position of y-axis. A direction of an incident wave may be expressed by a focal position, and the focal position may be predicted by using a sensor or by referring to a transmit beamforming value of a reference signal transferred from a base station. An initial recognition mode of a meta lens may be set by further considering a focal position with the above-described control value.

In addition, an initial recognition mode may be set based on frequency rate learning according to a direction of a terminal. As an example, even when a plane is converted to a spherical wave based on a meta lens, there may be a direction (e.g. building wall, ceiling, furniture) in which no wave propagation is needed inside a building. That is, wave propagation may be unnecessary or frequency needs to be low for a specific region, while a high frequency rate may be set for a specific region. Considering what is described above, an initial recognition mode may be set by reflecting a frequency rate learning result according to a direction of a terminal.

Figure 16:
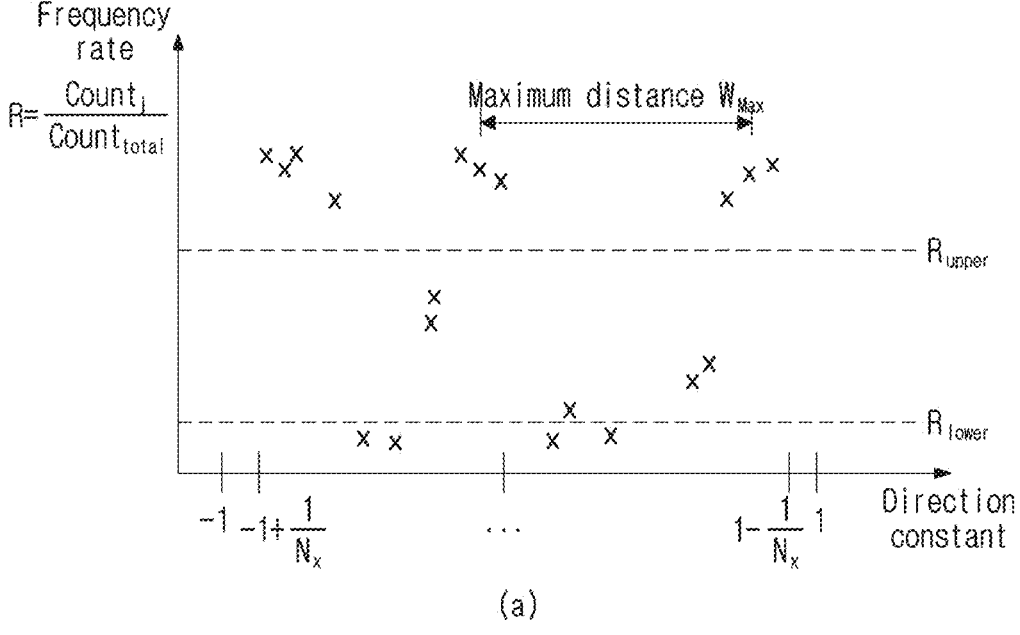
FIG. 16 is a view showing a frequency rate and a beam direction according to meta lens steerability according to an embodiment of the present disclosure.
Figure 16:
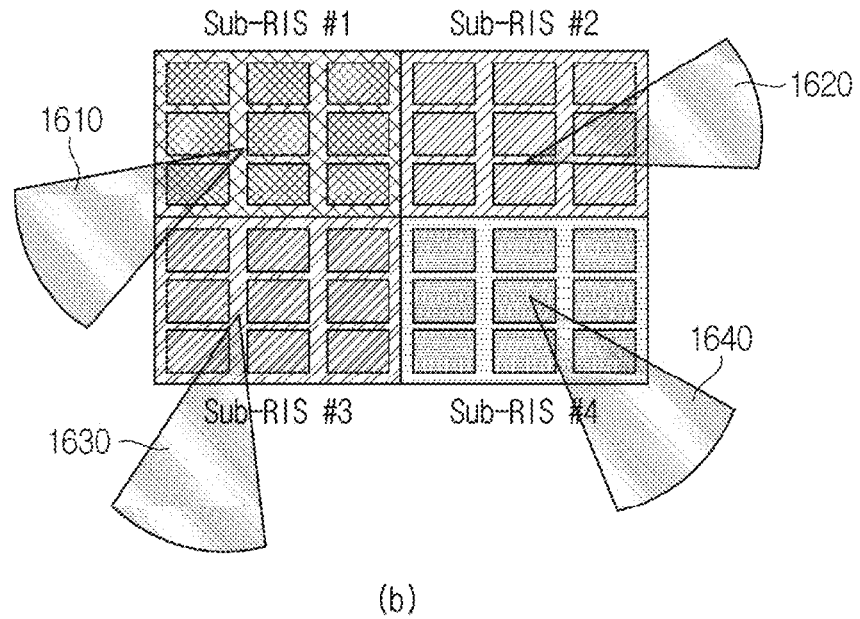

As an example, FIG. 16 is a view showing a frequency rate and a beam direction according to meta lens steerability according to an embodiment of the present disclosure. Referring to (a) of FIG. 16, $N_x$ may be a number of elements of a meta lens in an x-axis direction, and an angle of meta lens steerability may be represented by using constants of −1 for −90° and 1 for 90°. However, this is merely one example, and the present disclosure may not be limited to the above-described embodiment. Herein, in case a beam direction is expressed at an interval of $$\frac{180°}{N_x},$$

directionality may be expressed by constants $$a_x(i) = -1 + \frac{2_i - 1}{N_x}$$

and $i \in 1, 2, 3, \ldots, N_x$. In addition, a beam width may also be expressed at the interval of $$\frac{180°}{N_x}.$$

Here, if is $N_x$ is 4, a direction interval may be 45°, $a_x(0)$, $a_x(1)$, $a_x(2)$ and $a_x(3)$ may represent −67.5°, −22.5°, 22.5, and 67.5° respectively, and the beam width may also be $$45°\left(= \frac{180°}{N_x}\right).$$

In addition, a frequency rate R may be expressed by Equation 8 below.

$$R = \frac{Count_j}{Count_{total}} \qquad \text{[Equation 8]}$$

Here, the frequency rate R may be expressed as a count of direction index j $Count_j$ as compared with a total count of measurements $Count_{total}$, $R_{upper}$ and $R_{low}$ may mean an upper bound limit and a lower bound limit of frequency rate. As an example, among frequency rate R values, a frequency rate value below the lower bound limit may be neglected. In addition, among frequency rate R values, a maximum distance $W_{Max}$ may be measured for a direction constant with a frequency rate above the upper bound limit. As an example, because beam interference occurs when a beam width exceeds $W_{Max}$, $W_{Max}$ may be an upper bound limit of the beam width. Herein, based on what is described above, a plurality of beams 1610, 1620, 1630 and 1640 of a meta lens may be configured in a sub-array form as shown in (b) of FIG. 16. Herein, if the meta lens is composed of M sub-arrays, a beam width may be calculated by Equation 9 below.

$$\text{Beam Width} = \frac{2M}{N_x} \qquad \text{[Equation 9]}$$

Herein, the number M of sub-arrays increases, the beam width may increase. However, if the beam width increases to overlap, interference may occur. Herein, because the maximum distance $W_{Max}$ for a direction constant with a frequency rate is an upper bound limit of a beam width, an upper bound limit of the number M of sub-arrays may be expressed by Equation 10 below.

$$W_{Beam} \le W_{Max} \Rightarrow M \le \frac{W_{Max}N_x}{2} \qquad \text{[Equation 10]}$$

As an example, when the value of M increases, a beam-forming gain may decrease, and a size of a signal received by a terminal may decrease. That is, if the number of sub-arrays increases, a signal received by a terminal may become smaller.

Figure 17:
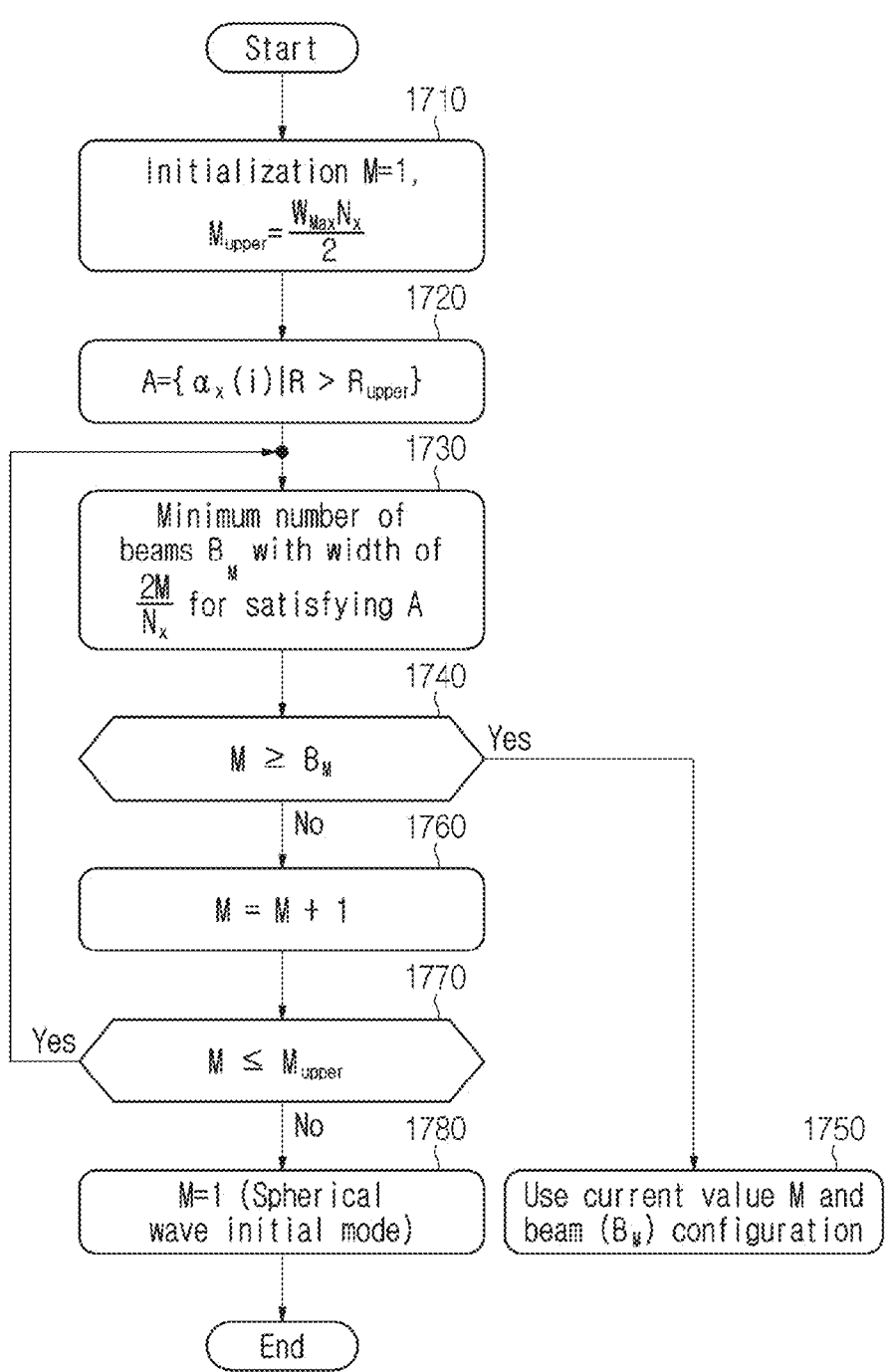
FIG. 17 is a flowchart showing a method for setting an initial recognition mode based on a frequency rate according to an embodiment of the present disclosure.

Herein, FIG. 17 is a flowchart showing a method for setting an initial recognition mode based on a frequency rate according to an embodiment of the present disclosure. Referring to FIG. 17, a number of sub-arrays and a beam used in an initial recognition mode may be set according to a frequency rate. As an example, the number M of sub-arrays may be initialized to 1, and an upper bound limit may be set as shown in Equation 11 below (S1710).

$$M_{upper} = \frac{W_{Max}N_x}{2} \qquad \text{[Equation 11]}$$

Herein, a set A of direction constant $a_x(i)$ with a frequency rate above $R_{upper}$ may be set (S1720). Next, a minimum number of beams $B_M$ with a width $$\frac{2M}{N_x}$$

satisfying A may be obtained by increasing M (S1730). That is, the minimum number of beams may be obtained by increasing the number of sub-arrays. Herein, if the number of sub-arrays is equal to or greater than the minimum number of required beams $B_M$ (S1740), the value M and the beam $B_M$ may be set (S1750). An initial recognition mode of a meta lens may be set according to the number M of sub-arrays and the beam $B_M$. On the other hand, if M increases but is smaller than $B_M$ (S1740), it is possible to increase the value M (S1760). Herein, the value M may be set not to exceed the upper bound limit $M_{upper}$ as a maximum number of sub-arrays (S1770). That is, if M is smaller than $M_{upper}$ (S1770), it is possible to check whether or not the increased M is greater than $B_M$, and this is the same as described above. On the other hand, if no beam is found until M becomes $M_{upper}$ (S1770), M may be set to 1 (S1780). That is, a sub-array in an initial recognition mode may be set to use a uniform spherical wave in every direction, and the initial recognition mode may be set based on what is descried above.

Figure 18:
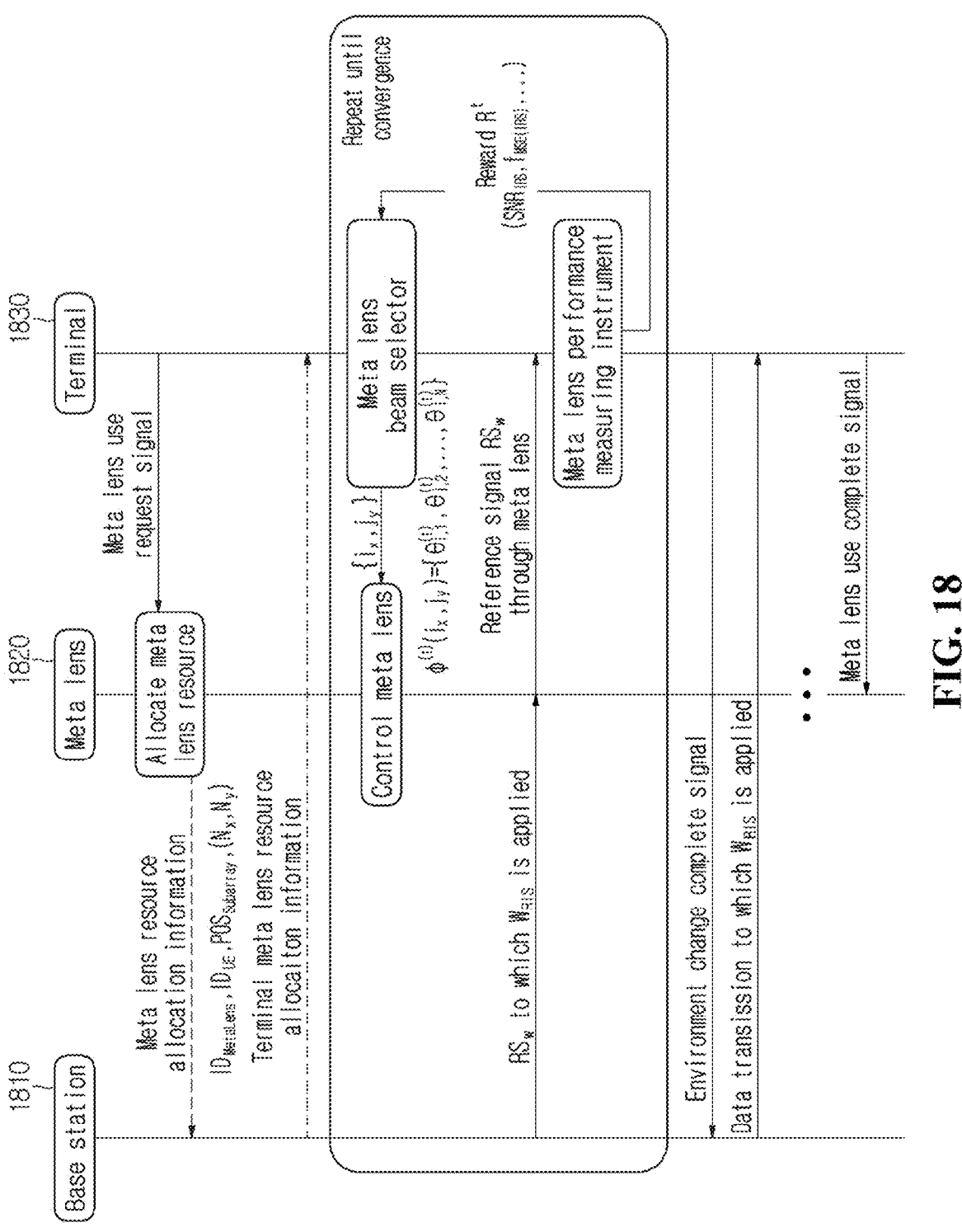
FIG. 18 is a view showing a signal flow among a base station, a RIS, and a terminal according to an embodiment of the present disclosure.
Figure 19:
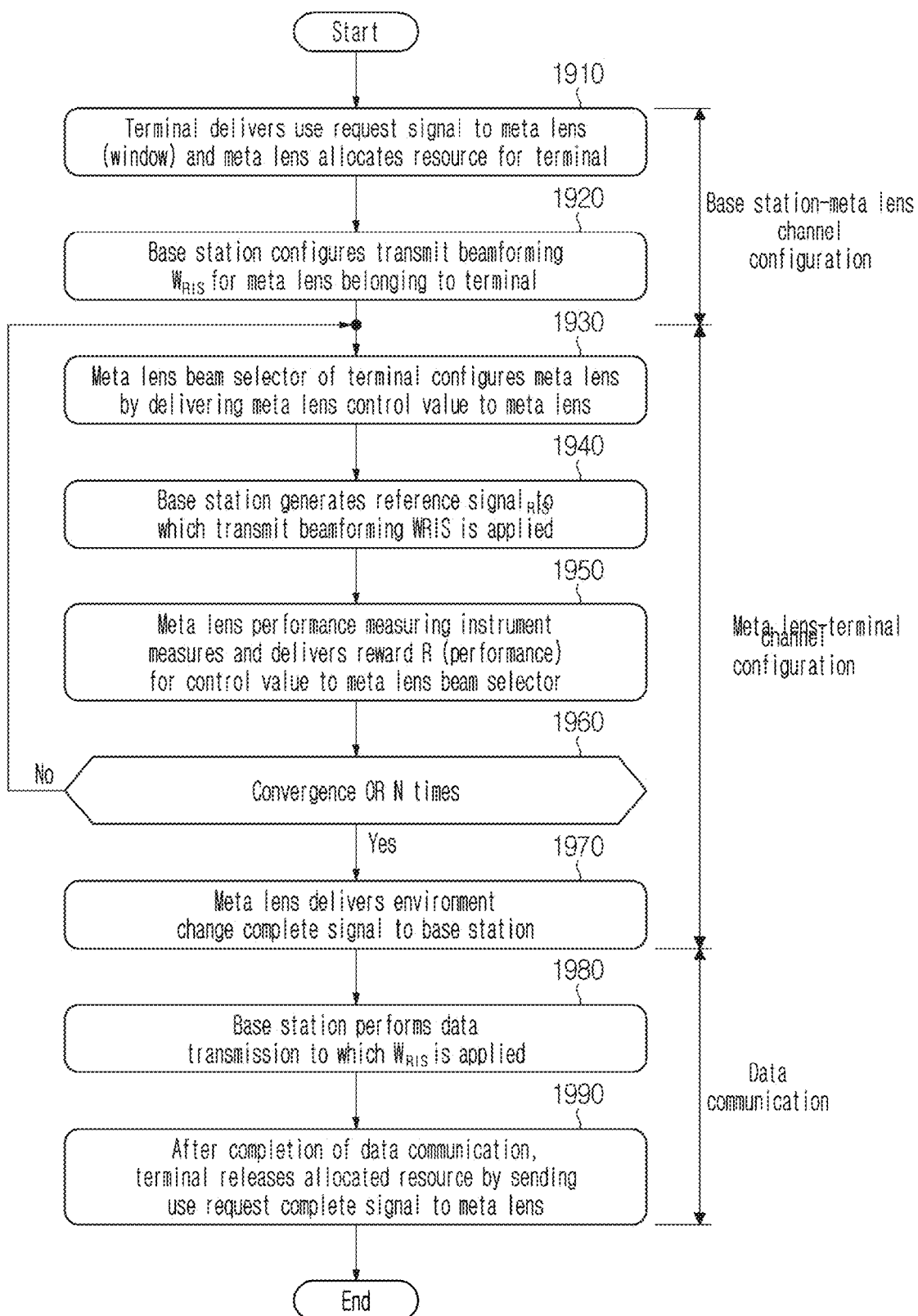
FIG. 19 is a view showing a signal flow among a base station, a RIS, and a terminal according to an embodiment of the present disclosure.

Herein, as an example, FIG. 18 is a view showing a signal flow among a base station, a RIS, and a terminal according to an embodiment of the present disclosure, and FIG. 19 is a flowchart showing a signal flow among a base station, a RIS, and a terminal according to an embodiment of the present disclosure. Referring to FIG. 18 and FIG. 19, a channel between a base station 1810 and a RIS (or meta lens) 1820 may be estimated and fixed. In addition, the base station 1810 may manage transmit beamforming $w_{RIS}$ for each RIS 1820 or meta lens, and this is the same as described above.

Next, in case a terminal 1830 transmits a use request signal to the RIS 1820, the RIS 1820 may allocate a resource (sub-array RIS) for the requesting terminal (S1910). As an example, the base station 1810 may estimate information on a meta lens, which is being used, through channel status information (CSI feedback) obtained from the terminal through a channel estimation method between the base station 1810 and the RIS 1820. As another example, the terminal 1830 may directly or indirectly obtain meta lens resource allocation information from a meta lens in a wired or wirelessly. The meta lens resource allocation information may include at least any one or more of unique ID information of the meta lens and the terminal $ID_{Meta}$ and $ID_{UE}$, sub-array position information allocated to the terminal Pos_subarray, a number of elements of an allocated sub-array $N_x$, $N_y$, and other information. Next, the base station 1810 may set transmit beamforming $w_{RIS}$ for the RIS 1820 included in the terminal (S1920). In addition, the terminal 1830 may obtain the above-described information and select a beam through an agent (or meta lens beam selector). As an example, the meta lens beam selector may be located in at least any one of the base station 1810, the RIS 1820, and the terminal 1830 and may not be limited to a specific embodiment. In FIG. 18 and FIG. 19, the terminal 1830 may be equipped with a meta lens beam selector and perform learning based on the selector. However, this is merely one example and may not be limited to the above-described embodiment. Specifically, the base station 1810 may set transmit beamforming $w_{RIS}$ for a meta lens, and an agent (meta lens selector) may calculate indexes $i_x$ and $i_y$ indicating an altitude angle and an azimuth in a metal lens control beam direction based on channel information that is obtained through learning or measurement through an AI and then transfer the indexes to a meta lens controller. That is, the meta lens beam selector of the terminal may set a metal lens by transferring a meta lens control value to the meta lens controller (S1930). Herein, the meta lens controller may set meta lens control values $$\Phi^{(t)}(i_x, j_y) = \{\theta^{(t)}_{i,1}, \theta^{(t)}_{i,2}, \dots, \theta^{(t)}_{i,N}\}$$

corresponding to the indexes. As an example, the terminal 1830 may calculate a reward by measuring a reference signal transmitted from the base station 1810 based on the set control value and use the reward for learning of an agent (or AI beam selector). That is, the base station 1810 may transfer a reference signal $RS_{RIS}$, to which transmit beamforming $w_{RIS}$ is applied, to the terminal 1830 through the RIS 1820 (S1940). Herein, a measuring instrument of meta lens performance of the terminal 1830 may measure and transfer a reward R for the control value to the meta lens beam selector (S1950). As another example, the base station 1810 may successively transmit the reference signal $RS_{RIS}$, which is transferred to the terminal 1830 and to which transmit beamforming $w_{RIS}$ is applied, and perform AI learning and selection based on a specific time unit. However, the present disclosure is not limited to the above-described embodiment.

Next, learning may be performed based on the meta lens beam selector, and the learning may be repeated until convergence to a specific value (S1960). Herein, when convergence is completed by satisfying a number of repeated learning and a performance condition, the terminal 1830 may transfer an environment change complete signal to the base station 1810 (S1970). Next, the base station 1810 and the terminal 1830 may start data communication. That is, the base station 1810 may transmit data to which transmit beamforming $w_{RIS}$ (S1980). Next, when the terminal 1830 completes communication, the terminal 1830 may transmit a meta lens use complete signal and remove resource allocation of a meta lens based on the signal (S1990).

Herein, as an example, channel configuration between a RIS (or meta lens) and a terminal may be a step of finding and applying an optimal meta lens control value by using a meta lens beam selector, and this may be the same as described above. At this time, a reference signal, to which a transmit beamforming vector $w_{RIS}$ calculated at the channel estimation step is applied, may be transferred to the RIS at a channel change step. The meta lens beam selector may predict a control value $$\Phi^{(t)} = \{\theta^{(t)}_{i,1}, \theta^{(t)}_{i,2}, \dots, \theta^{(t)}_{i,N}\}$$

for each RIS element and transfer the value to the meta lens controller.

Herein, as an example, in case a convergence value is derived by repeating learning, as described above, supervised learning may be performed with a control value that is obtained through AO optimization or an optimizing algorithm such as SDR. Herein, the convergence value may be quickly estimated through a pre-trained model, but there may be a limitation on model update.

As another example, in case a convergence value is derived by repeating learning, as described above, a prediction value may be derived through reinforcement learning, which is an unsupervised learning, and a reward may be obtained accordingly, so that a model may keep updated. As an example, repetition is needed until rewards or prediction values converge, but a number of repetitions may be reduced based on transfer learning or model update. As another example, a metal lens beam selector may not perform learning through an AI but select a beam through channel estimation of a reference signal and is not limited to a specific embodiment.

Figure 20:
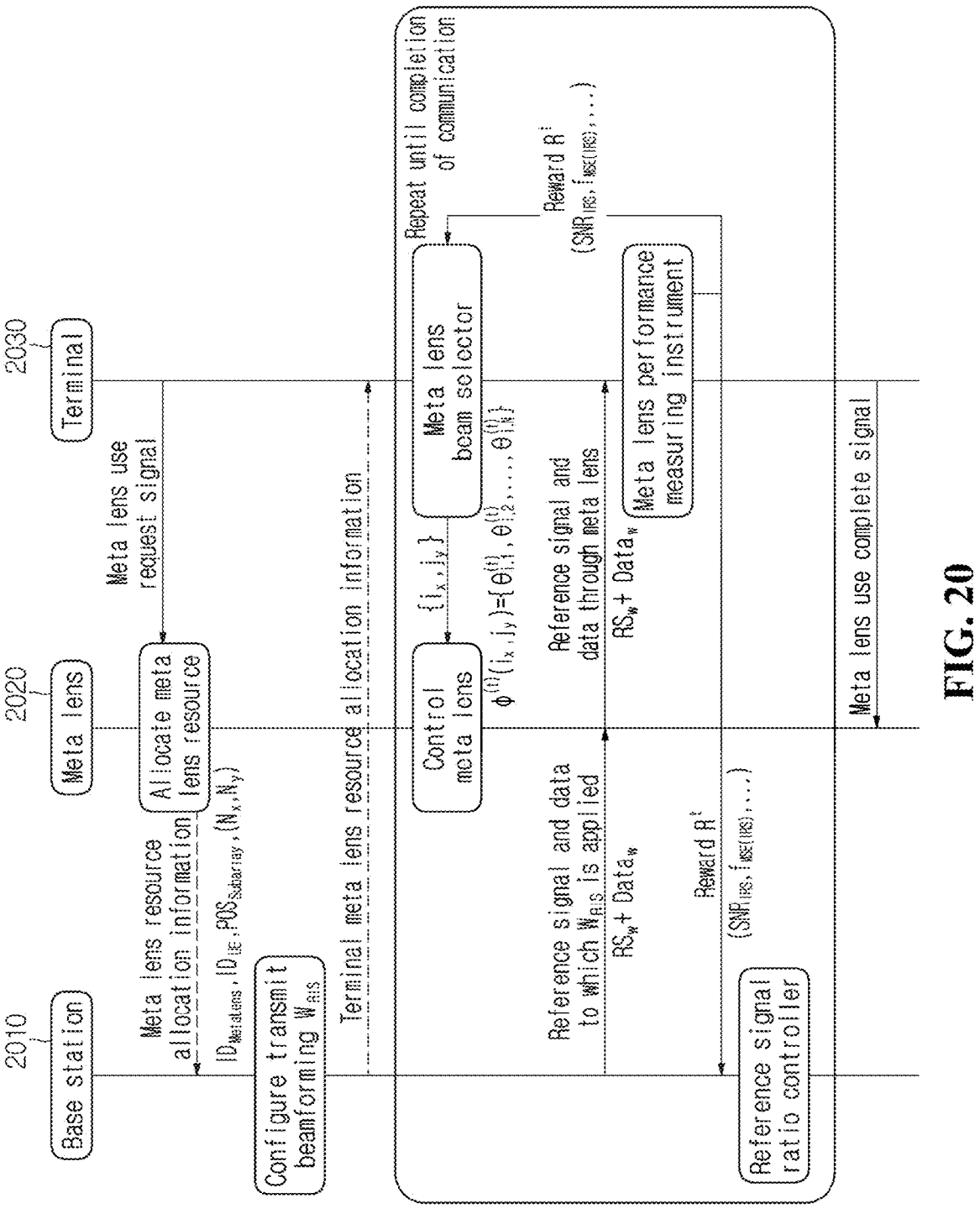
FIG. 20 is a view showing a method for performing data communication and RIS-terminal configuration simultaneously according to an embodiment of the present disclosure.
Figure 21:
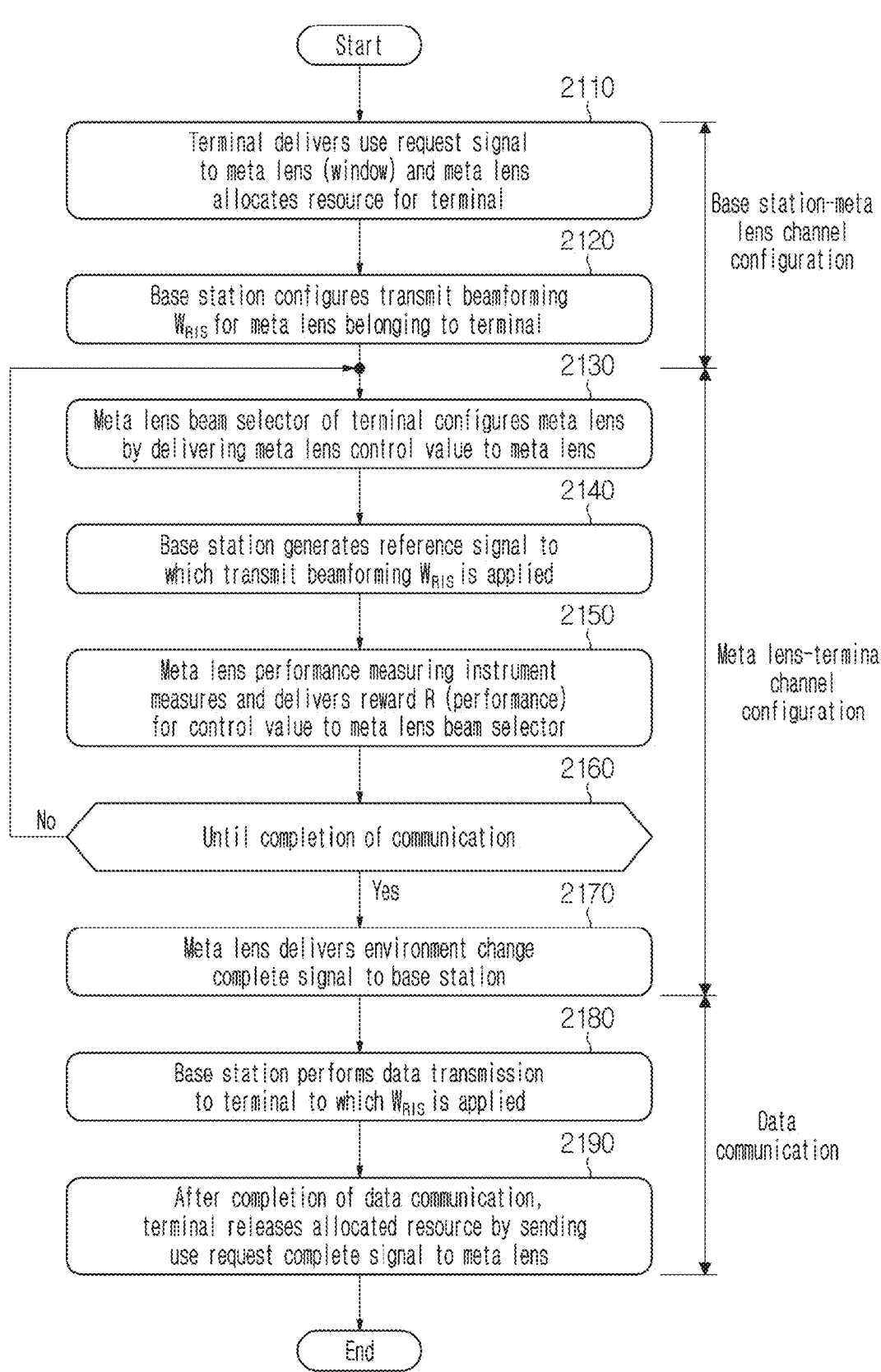
FIG. 21 is a view showing a method for performing data communication and RIS-terminal configuration simultaneously according to an embodiment of the present disclosure.

As another example, FIG. 20 and FIG. 21 are views showing a method for performing data communication and RIS-terminal configuration simultaneously according to an embodiment of the present disclosure. Referring to FIG. 20 and FIG. 21, data communication and channel configuration between a RIS 2020 and a terminal 2030 may be performed simultaneously. Herein, when data communication and channel configuration between the RIS 2020 and the terminal 2030 are performed simultaneously, the data communication may need to be free from the influence of a beam configuration of the RIS 2020. Accordingly, in case the terminal 2030 transmits a meta lens use request signal, the RIS (or meta lens) 2020 may allocate a resource for each sub-array to be found by changing a sub-array for an initial recognition mode and a beam direction. As another example, the RIS 2020 may also use a fixed sub-array for an initial recognition mode and may not be limited to a specific embodiment.

Herein, when data communication and channel configuration between the RIS 2020 and the terminal 2030 are performed simultaneously, two steps may be distinguished between channel configuration between a base station 2010 and the RIS 2020 and channel configuration between the RIS 2020 and the terminal.

As an example, the channel configuration between the base station 2010 and the RIS 2020 may be the same as FIG. 18 and FIG. 19 described above. Specifically, the base station 2010 may manage transmit beamforming $w_{RIS}$ for each RIS 2020 or meta lens, and this is the same as described above.

In case the terminal 2030 transits a use request signal to the RIS 2020, the RIS 2020 may allocate a resource for the requesting terminal (S2110). As an example, the base station 2010 may estimate information on a meta lens being used through channel status information (CSI feedback) that is obtained from a channel estimation method between the base station 2010 and the RIS 2020. As another example, the terminal 2030 may obtain meta lens resource allocation information directly from a meta lens wired or wirelessly. The meta lens resource allocation information may include at least any one or more of unique ID information of the meta lens and the terminal $ID_{Meta}$ and $ID_{UE}$, sub-array position information allocated to the terminal Pos_subarray, a number of elements of an allocated sub-array $N_x$, $N_y$, and other information.

Next, the base station 2010 may set transmit beamforming $w_{RIS}$ for the RIS 2020 included in the terminal (S2120). In addition, the terminal 2030 may obtain the above-described information and select a beam through an agent (or meta lens beam selector). As an example, the meta lens beam selector may be located in at least any one of the base station 2010, the RIS 2020, and the terminal 2030 and may not be limited to a specific embodiment. In FIG. 20 and FIG. 21, the terminal 2030 may be equipped with a meta lens beam selector and perform learning based on the selector. However, this is merely one example and may not be limited to the above-described embodiment. Specifically, the base station 2010 may set transmit beamforming $w_{RIS}$ for a meta lens, and an agent (meta lens selector) may calculate indexes $i_x$ and $i_y$ indicating an altitude angle and an azimuth in a metal lens control beam direction based on channel information that is obtained through learning or measurement through an AI and then transfer the indexes to a meta lens controller. That is, the meta lens beam selector of the terminal may set a metal lens by transferring a meta lens control value to the meta lens controller (S2130). Herein, the meta lens controller may set meta lens control values $$\Phi^{(t)}(i_x, j_y) = \{\theta_{i,1}^{(t)}, \theta_{i,2}^{(t)}, \dots, \theta_{i,N}^{(t)}\}$$

corresponding to the indexes.

As an example, the terminal 2030 may receive a reference signal and data transmitted from the base station 2010 based on the set control value and calculate and use a reward for learning. That is, the base station 2010 may transfer a reference signal $RS_{RIS}$ and data $Data_w$, to which the transmit beamforming $w_{RIS}$ is applied, to the terminal 2030 through the RIS 2020 (S2140). Herein, a measuring instrument of meta lens performance of the terminal 2030 may measure and transfer a reward R for the control value to the meta lens beam selector (S2150). In addition, the terminal 2030 may transmit information on the reward R to the base station 2010. Herein, the base station 2010 may adjust a reference signal ratio based on the reward obtained from the terminal 2030. The base station 2010 may adjust data throughput by adjusting a ratio of a reference signal through the reward.

Next, learning may be performed based on the meta lens beam selector, and the learning may be repeated until convergence to a specific value (S2160). Herein, when convergence is completed by satisfying a number of repeated learning and a performance condition, the terminal 2030 may transfer an environment change complete signal to the base station 2010 (S2170). Next, the base station 2010 and the terminal 2030 may start data communication. That is, the base station 2010 may transmit data to which transmit beamforming $w_{RIS}$ (S2180). Next, when the terminal 2030 completes communication, the terminal 2030 may transmit a meta lens use complete signal and remove resource allocation of a meta lens based on the signal (S2190).

Herein, as an example, when the above-described operation is performed, a reference signal $RS_{RIS}$, to which the transmit beamforming $w_{RIS}$ is applied, may be used to generate a reward in the terminal 2030. In addition, the data $Data_w$ may be used by the terminal. Herein, because there is a sub-array for an initial recognition mode, data communication may be initially possible even before convergence to a target sub-array through successive changes of a beam direction.

Figure 22:
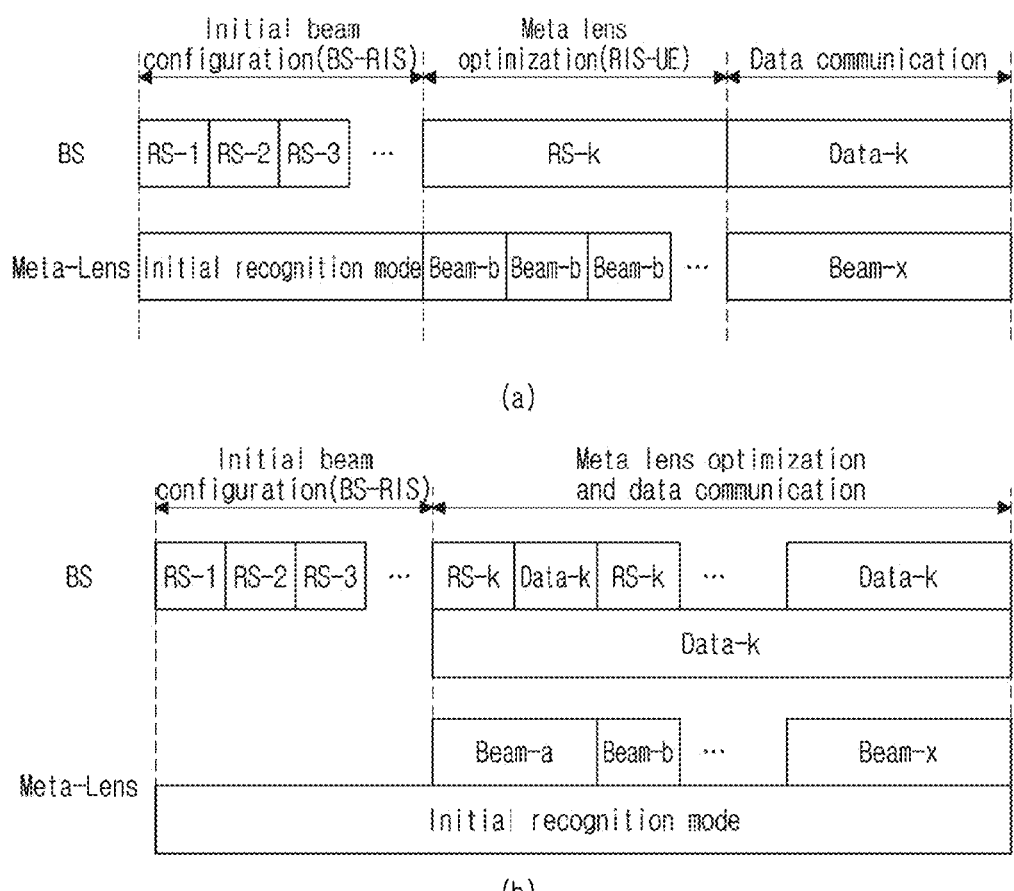
FIG. 22 is a view showing a method for performing initial beam configuration of a base station by using an initial recognition mode of a meta lens according to an embodiment of the present disclosure.
Figure 23:
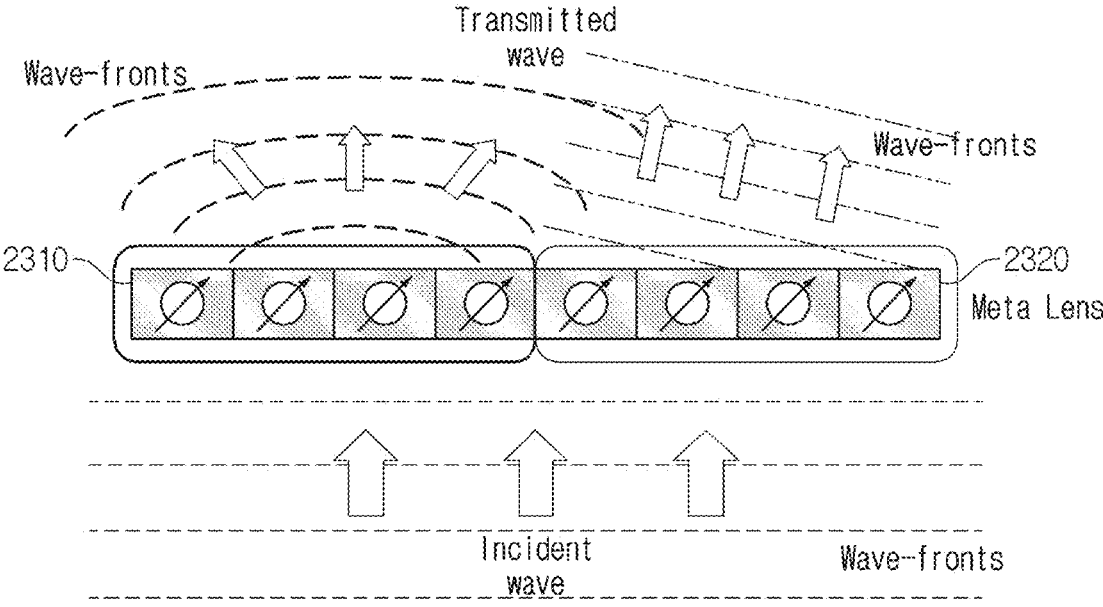
FIG. 23 is a view showing a method for controlling a beam direction together with an initial recognition mode through a sub-array according to an embodiment of the present disclosure.

In addition, as an example, FIG. 22 is a view showing a method for performing initial beam configuration of a base station by using an initial recognition mode of a meta lens according to an embodiment of the present disclosure. Referring to (a) of FIG. 22, initial beam configuration of a base station and meta lens optimization may be performed in three steps. More specifically, a base station and a RIS may perform initial beam configuration. Herein, the RIS (or meta lens) may operate in an initial recognition mode. The base station may sweep and transmit at least one or more reference signals RS-1, RS-2 and RS-3, which may be transmitted to a terminal through the RIS. Herein, the RIS may operate in the above-described initial recognition mode. Next, the terminal may measure a reception power of each transmitted beam and perform measurement report to the base station through CSI feedback. Next, the base station may determine transmit beamforming $w_{RIS}$. As an example, it is possible to consider a case where a RS-k beam is selected by a measurement report. Herein, when the RIS and the terminal perform meta lens optimization, the terminal may measure a reception power by changing beam steerability Beam-a and Beam-b through adjustment of a control value of a meta lens controller based on learning or channel measurement. Next, when a specific beam is selected through convergence or channel measurement based on a number of learning or performance, the RIS and the terminal may perform data communication through a beam that is configured by an optimized value. As an example, (a) of FIG. 22 may be a case of selecting a beam-X but may not be limited to the embodiment. As another example, referring to (b) of FIG. 22, the above-described initial beam configuration and optimization may be performed in two steps. Herein, the initial beam configuration between a base station and a RIS may be the same as (a) of FIG. 22. Next, when the RIS and the terminal perform meta lens optimization, the terminal may receive data together with a reference signal. That is, the terminal may process the reference signal and the data simultaneously. Herein, as an example, in case search is performed by changing a beam direction between a meta lens and the terminal using a sub-array, it may be impossible to perform the search and data communication simultaneously. However, if a sub-array resource for searching for a beam direction and a sub-array resource of an initial recognition mode for data communication are used simultaneously, the data communication may be performed together with a reference signal, as described above. As an example, FIG. 23 is a view showing a method for controlling a beam direction together with an initial recognition mode through a sub-array according to an embodiment of the present disclosure. Referring to FIG. 23, a first sub-array 2310 as an initial recognition mode may transfer a radio wave in every direction. On the other hand, a second sub-array 2320 may search for an optimal meta lens control value by transferring a reference signal through beam control. That is, as in FIG. 23, meta lens optimization and data communication may be performed simultaneously through the first sub-array 2310 and the second sub-array 2320.

Figure 24:
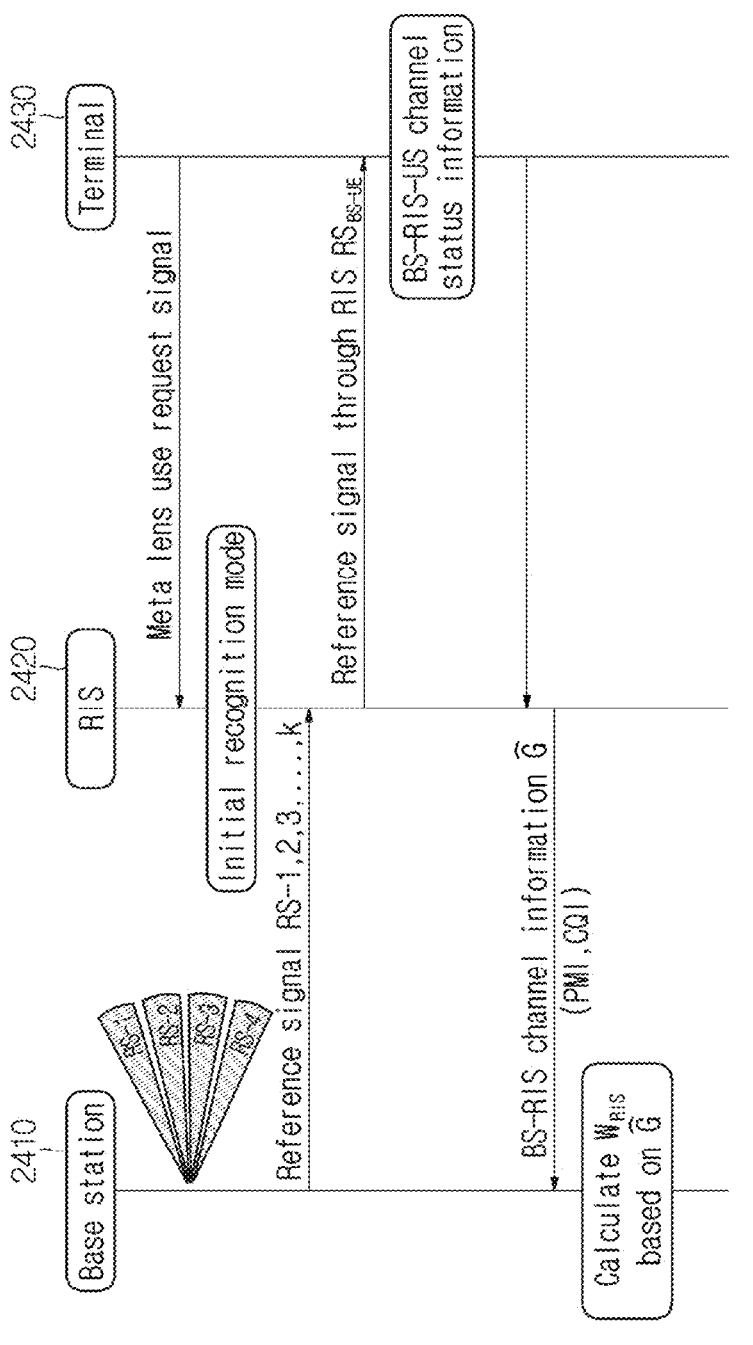
FIG. 24 is a view showing a method for configuring an initial beam by a base station and a RIS according to an embodiment of the present disclosure.
Figure 25:
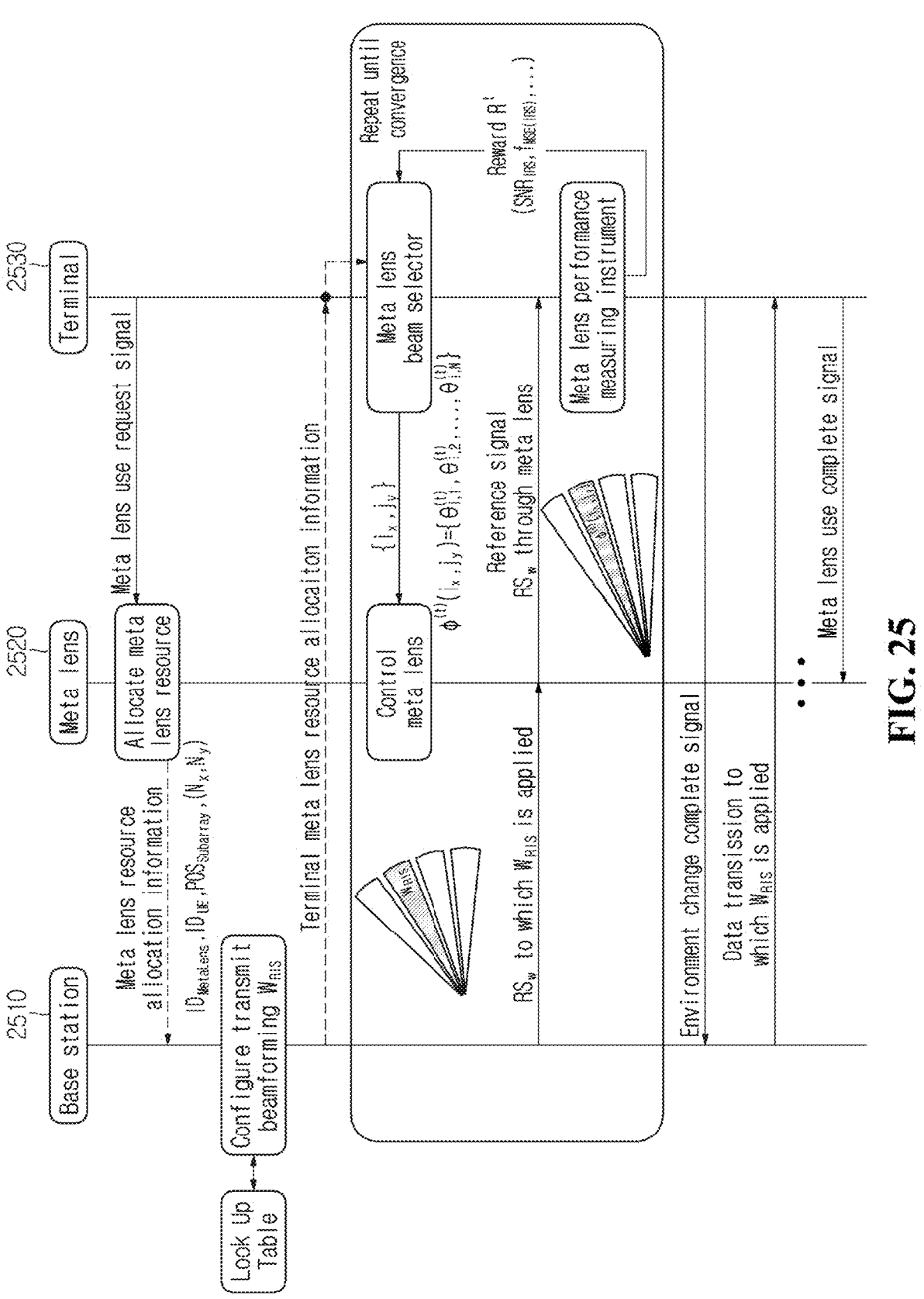
FIG. 25 is a view showing a method for configuring an initial beam by a base station and a RIS according to an embodiment of the present disclosure.

In addition, as an example. FIG. 24 and FIG. 25 are views showing a method for configuring an initial beam by a base station and a RIS according to an embodiment of the present disclosure. Referring to FIG. 24, a terminal 2430 may transfer a meta lens use request signal to a RIS 2420, and the RIS 2420 may operate in an initial recognition mode. Next, a base station 2410 may transfer at least one reference signal to the terminal 2430 through the RIS 2420 based on beam sweeping. The terminal 2430 may transfer channel status information among the base station 2410, the RIS 2420 and the terminal 2430 to the RIS 2420, and estimated channel information G' may be transferred to the base station 2410. Herein, the estimated channel information G' may include at least any one of a precoding matrix indicator (PMI) and a channel quality indicator (CQI) of a reference signal but is not limited to a specific embodiment. Next, the base station 2410 may calculate transmit beamforming $w_{RIS}$ through the channel information G'. Herein, as an example, referring to FIG. 25, when a RIS 2520 receives a meta lens use request signal of a terminal 2530, the RIS 2520 may transmit meta lens resource allocation information to a base station 2510, which is the same as described above. Herein, the base station 2510 may compare at least any one of the above-described PMI and CQI with a lookup table during a process of configuring transmit beamforming $w_{RIS}$. That is, the transmit beamforming $w_{RIS}$ may be calculated through a preset value based on the channel information G' or a table but may not be limited to a specific embodiment. Next, meta lens optimization between the terminal 2530 and the RIS 2520 may be performed, and this is the same as described above.

Figure 26:
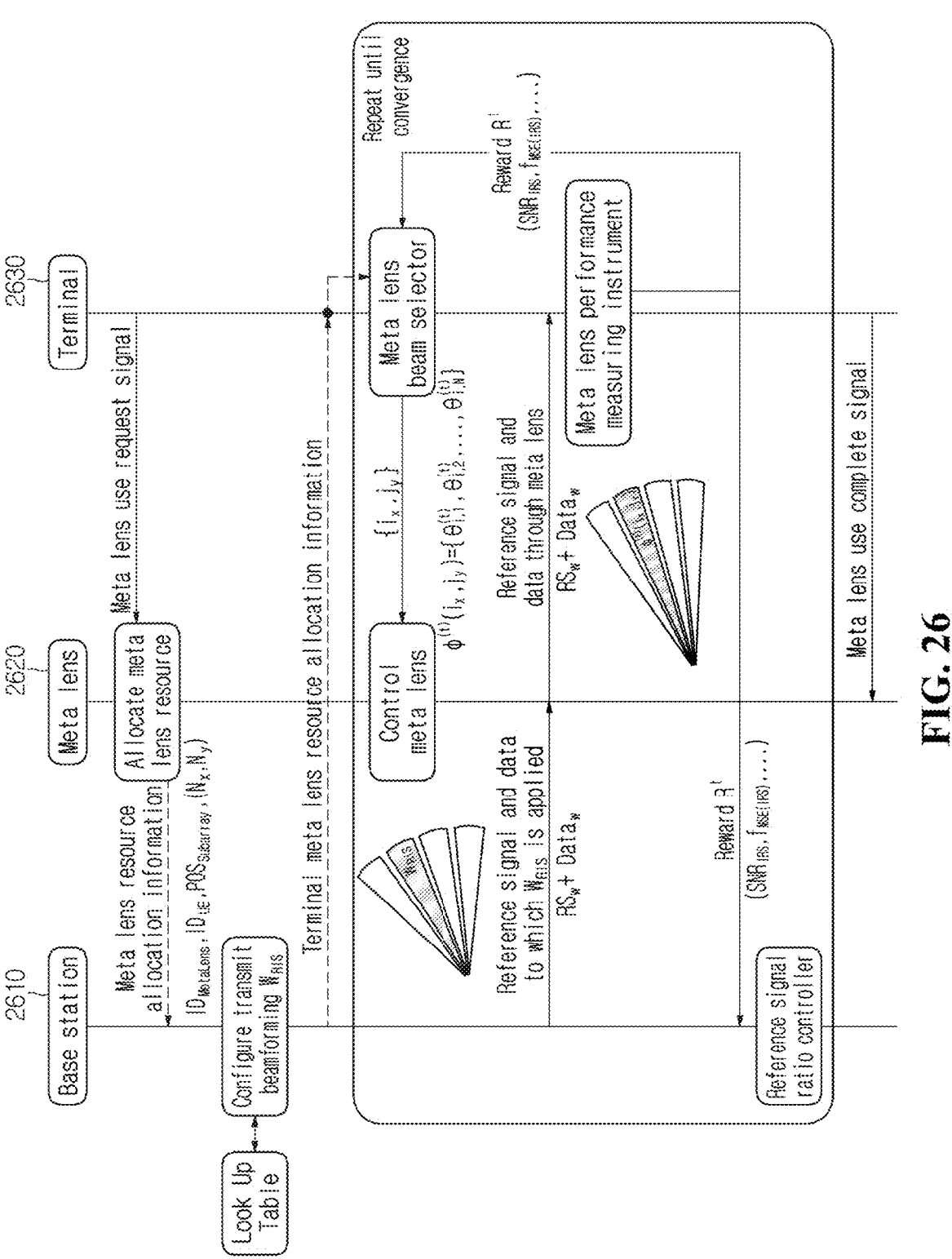
FIG. 26 is a view showing a method for configuring an initial beam by a base station and a RIS according to an embodiment of the present disclosure.

In addition, as an example, FIG. 26 is a view showing a method for configuring an initial beam by a base station and a RIS according to an embodiment of the present disclosure. Referring to FIG. 26, transmit beamforming $w_{RIS}$ may be calculated between a base station 2610 and a RIS 2620, and meta lens optimization may be performed between the RIS 2620 and a terminal 2630. Herein, the meta lens optimization may be performed together with data transmission along with transmission of a reference signal, and this is the same as described above.

Herein, as an example, when a meta lens beam selector selects a beam based on reference signal measurement through a meta lens, the beam configured by the meta lens beam selector may be represented suing a codebook. As a concrete example, an AI beam selector may represent a configured beam in a codebook form and simplify an AI model. Herein, a direction vector function, which marks an array response vector in a reception direction, may be expressed by Equation 12 below.

$$u(\omega, N) = \left[1, e^{-j\pi \cdot 1 \cdot \omega}, e^{-j\pi \cdot 2 \cdot \omega}, \dots, e^{-j\pi \cdot N \cdot \omega}\right]^T \quad \text{[Equation 12]}$$

In Equation 12, N may be a size of an array (antenna or IRS element), and w may be a phase difference between antennas or IRS elements.

As an example, a reception response vector $a_r(\Phi_r, \theta_r)$ for a signal, which a base station transfers to an IRS based on beamforming, may be expressed as a direction vector function $u(\omega, N)$ as shown in Equation 13 below.

$$a_r(\Phi_r, \theta_r) = u(\varphi_r, N_x) \otimes u(\vartheta_r, N_y) \quad \text{[Equation 13]}$$
$$\varphi_r = \frac{2d}{\lambda}\cos(\Phi_r)\sin(\theta_r), \quad \vartheta_r = \frac{2d}{\lambda}\cos(\theta_r), \varphi_r, \quad \vartheta_r \in \left[-\frac{2d}{\lambda}, \frac{2d}{\lambda}\right]$$

In Equation 13, $\Phi_r$ may be an azimuth of an IRS, $\theta_r$ may be an altitude angle, $N_x$ and $N_y$ may be a number of widths and a number of heights for IRA element, respectively, and $\otimes$ may represent a Kronecker product. In addition, a transmission response vector $b_t(\Phi_t, \theta_t)$ of IRS may also be expressed as a direction vector function $u(\omega, N)$, as shown in Equation 14 below.

$$b_t(\Phi_t, \theta_t) = u(\varphi_t, N_x) \otimes u(\vartheta_t, N_y), \quad \text{[Equation 14]}$$
$$\varphi_t = \frac{2d}{\lambda}\cos(\Phi_t)\sin(\theta_t), \quad \vartheta_t = \frac{2d}{\lambda}\cos(\theta_t)$$

In addition, for a transmission signal $x_k$, to which transmit beamforming is applied, a signal through an IRS may be expressed as in Equation 15 below.

$$y = (h_{r,k}\Phi G)x_k + n_k = \quad \text{[Equation 15]}$$
$$gh_k \cdot b_t^H(\Phi_t, \theta_t)\Phi a_r(\Phi_r, \theta_r)x_k + n_k = gh_k c_k^H v \, x_k + n_k$$

*272 In Equation 15, $$G = g \cdot a_r(\Phi_r, \theta_r), \quad h_{r,k} = h_k \cdot b_t^H(\Phi_t, \theta_t), g$$

is a path gain of a BS-IRS channel, $h_k$ may be a path gain of a IRS-UE channel. In addition, $\Phi$ is a phase value matrix of an IRS element and may be expressed by $\Phi=\text{diag}(v)$, $v=[e^{j\omega_1}, e^{j\omega_2}, \ldots, e^{j\omega_N}]$. In addition, in $$c_k^H = b_t^H(\phi_t, \theta_t) \odot a_r(\phi_r, \theta_r),$$

$\odot$ is a Hadamard product, which may a product of elements between matrices, as shown in Equation 16.

$$
\begin{aligned}
c_k^H &= b_t^H(\phi_t, \theta_t) \odot a_r(\phi_r, \theta_r) \quad \text{[Equation 16]} \\
&= \left(u^H(\varphi_t, N_x) \otimes u^H(\vartheta_t, N_y)\right) \odot \left(u^T(\varphi_r, N_x) \otimes u^T(\vartheta_r, N_y)\right) \\
&= \left(u^H(\varphi_t, N_x) \odot u^T(\varphi_r, N_x)\right) \otimes \left(u^T(\vartheta_t, N_y) \odot u^T(\vartheta_r, N_y)\right) \\
&= u(\tilde{\varphi}_k, N_x) \otimes u(\tilde{\vartheta}_k, N_y) \\
&\tilde{\varphi}_k = \varphi_t - \varphi_r, \ \tilde{\vartheta}_k = \vartheta_t - \vartheta_r, \ \tilde{\varphi}_k, \tilde{\vartheta}_k \in \left[-\frac{4d}{\lambda}, \frac{4d}{\lambda}\right]
\end{aligned}
$$

In Equation 16, because $u(\omega, N)$ is a function with a period of 2, $\varphi_k = \tilde{\varphi}_k \bmod 2$, $\vartheta_k = \tilde{\vartheta}_k \bmod 2$ may be possible, and thus the equation may be expressed as $$c_k^H = u(\varphi_k, N_x) \otimes u(\vartheta_k\ N_y), \ \varphi_k, \vartheta_k \in [-1, 1].$$

In addition, an optimal beamforming vector v of an IRS, which maximizes an SNR of a reception signal, may be $c_k$, which may be expressed by a Kronecker product of direction vector functions $u(\omega, N)$ of an azimuth and an altitude angle.

That is, an IRS control value may be managed in forms of an azimuth and an altitude angle, and a control value according to each direction may be managed by a codebook. As an example, a codebook $\tilde{w}(j)=\{\tilde{w}(1), \tilde{w}(2), \ldots, \tilde{w}(J)\}$ is a set of IRS direction vectors and may have sizes of $\tilde{w}_x(j) \in \mathbb{C}^{N_x \times 1}$, $\tilde{w}_y(j) \in \mathbb{C}^{N_y \times 1}$ in horizontal and vertical directions, respectively. In addition, an index of a direction vector is $j \in J$, and J may be a total number of expressible direction vectors. As an example, J is a value expressing a number of beams used in horizontal and vertical directions, and it may be expressed by $J_x$ and $J_y$ for the horizontal direction and the vertical direction respectively.

Herein, a beam configured by a final AI beam selector may be expressed as in Equation 18, which is based on Equation 17.

$$\tilde{w}_x(i) = u(\alpha_x(i), N_x), \quad \text{[Equation 17]}$$

$$\tilde{w}_y(j) = u(\alpha_y(j), N_y), \ \alpha_x(i) = -1 + \frac{2i-1}{J_x},$$

$$\alpha_y(j) = -1 + \frac{2j-1}{J_y}, \ i \in \{1, 2, 3, \ldots, J_x\}, j \in \{1, 2, 3, \ldots, J_y\}$$

$$\tilde{w}(i, j) = \tilde{w}_x(i) \otimes \tilde{w}_y(j) = u(\varphi_i, N_x) \otimes u(\vartheta_j, N_y) \quad \text{[Equation 18]}$$

That is, an AI beam selector may express a beam through a codebook, as described above, and thus an AI model may be simplified.

In addition, as an example, based on an SRE AI system, an AI beam selector may perform learning based on reinforcement learning. Herein, as an example, reinforcement learning may consist of two inputs and one output. State information and a reward may be used as the inputs, and an agent action may be selected for the output. Herein, as an example, reinforcement learning may be a multi-armed bandit (MAB), and an MAB may not use any state information but is not limited thereto. In addition, an action as the output may be an operation of a RIS controller for selecting a beam that provides an optimal communication environment to a terminal. As an example, an AI beam selector may obtain a reward for an action and changed state information and use them for learning. In addition, the AI beam selector may repeat an operation of selecting an action again based on an input after learning.

Herein, this may be a method of determining a state, a reward, and an action by considering each element of an environment by an AI beam selector. Herein, as an example, as for an environment, it is possible to consider not only a channel environment for transferring a signal but also an environment among a base station, a terminal, and a RIS for measuring a reward and a channel state. As a concrete example, for a state, horizontal and vertical indexes $i_x$ and $i_y$ of a beam selector, which are selected as factors from an environment immediately before, may be used. In addition, as an example, in order to reflect a change of an environment for a RIS control value in a state, a terminal may add measured channel information $\hat{h}_{eff,k}$ in the state. Herein, the channel information may be a measured value or be replaced with indirect indicators CQI, SNR and $f_{MSE}$. In addition, as an example, by adding control signaling, a position of a sub-array allocated to a terminal and a number of elements of the allocated sub-array may be added as state variables, as shown in Equation 19 below.

$$s_t = \left\{(i_x, j_y), \hat{h}_{eff,k}, Pos_{Subarray}, sub\#N_x, sub\#N_y\right\} \quad \text{[Equation 19]}$$

In addition, an action is to select an index of a codebook that indicates a beam direction vector of an IRS, and phase shift values of each IRS element may be finally applied. Based on what is described above, an action of an AI beam selector may be expressed by Equation 20.

$$a_t = \tilde{w}(i_x, j_y), \ i_x \in \{1, 2, 3, \ldots, J_x\}, j_y \in \{1, 2, 3, \ldots, J_y\} \quad \text{[Equation 20]}$$

Here, an action value is a value that is configured based on a codebook through an IRS direction vector generator, and an AI may actually select indexes of an azimuth and an altitude angle of a direction vector. In addition, as an example, a reward is a value measured by a terminal and may be a result value for a control value selected by an IRS. As an example, if a block received from a terminal is added to an IRS, it may be directly received, but the cost of the IRS may increase. Accordingly, an IRS may obtain a reward from a base station based on information transmitted to the base station but may not be limited thereto. In addition, as an example, a reward may be determined by considering another purpose of use. In addition, as an example, as described above, a terminal may include an IRS performance measuring instrument. However, as an example, when an IRS performance measuring instrument is not used, a reward may be channel-related information that a terminal measures based on a reference signal, as shown in Equation 21 below.

$$r_t = R' = SNR \text{ or } f_{MSE} \text{ or } CQI \ldots \quad \text{[Equation 21]}$$

In addition, as an example, FIG. 20 is a view illustrating usage blocks of a terminal and a base station among environmental constituents in an AI beam selector according to an embodiment of the present disclosure. As an example, referring to FIG. 20, a base station may generate and transfer a reference signal via a radio channel. In addition, a terminal may obtain the generated reference signal from the base station through an IRS and determine channel status information and reward information by measuring the reference signal. As an example, the channel status information may include information on a direct measurement result of a channel and indirect information associated with the channel and may not be limited to a specific form. Herein, as for environmental constituents, operations of not only the IRS but also the base station and the terminal may be considered and are not limited to the above-described embodiment.

In addition, as an example, FIG. 21 is a view showing a structure of an AI beam selector according to an embodiment of the present disclosure. As an example, an AI beam selector may be divided into a selecting AI and an IRS generator. As an example, based on reinforcement learning, an AI beam selector may derive a value through state information and a reward, as shown in Equation 22 below, and thus derive the above-described action value.

$$\alpha_x(i) = -1 + \frac{2i-1}{J_x}, \; \alpha_y(j) = -1 + \frac{2j-1}{J_y} \qquad \text{[Equation 22]}$$

More specifically, a selecting AI may perform a role of learning and predicting an IRS control value in order to construct an optimal wireless environment. Herein, as described above, the selecting AI may be implemented through reinforcement learning or MAB but may not be limited thereto. In addition, an IRS direction vector generator may generate a control value of each element based on a codebook. That is, because the selecting AI is trained in an index form of codebook, the dimensions of state and action may be reduced. Accordingly, compared with a learning method according to each element, it may be advantageous with respect to model size, complexity and convergence speed. Based on what is described above, an optimized IRS control value may be generated without significant effect on a number M of antennas of a base station and a number N of elements of IRS.

In addition, as an example, FIG. 22 is a view showing a method of implementing an AI beam selector through an MAB AI according to an embodiment of the present disclosure. As an example, referring to FIG. 22, a selecting AI (AI beam selector), which uses an MAB AI using Thompson sampling), may be mainly divided into a learning unit and a selection unit. Herein, the learning unit may update Thompson sampling parameters $\alpha$ and $\beta$ for an immediate previous action based on a reward. Herein, the learning of $\alpha$ and $\beta$ according to the reward may be as shown in Equation 23 below.

$$\alpha_i = \alpha_i + 1, \quad \text{if } R > R_{th}, \qquad \text{[Equation 23]}$$

$$\beta_i = \beta_i + 1, \quad \text{else}$$

Here, $R_{th}$ is a reward that becomes a reference, and may be differently set according to a reward form of an IRS performance measuring instrument of a terminal. In addition, the selection unit may select an index of a beam direction with a largest value among values that are obtained by applying the accumulated Thompson sample parameters $\alpha$ and $\beta$ to a beta distribution. As an example, the selected $a_r(i_x)a_r(j_y)$ may be transferred to an IRS direction vector generator. The IRS direction vector generator may use a method of individually selecting indexes indicating directions for an azimuth and an altitude angle based on the above-described value. As another example, the IRS direction vector generator may make a selection through a method of combining an azimuth and an altitude angle like $k_{x,y}=(i_x, j_y)$ and using a new index $k_{x,y}$. As another example, an equation about the beta distribution may be expressed as Equation 24 below.

$$\text{Beta}(x|a, b) = \frac{1}{B(a, b)} x^{a-1}(1-x)^{b-1}, \qquad \text{[Equation 24]}$$

$$B(a, b) = \int_0^1 x^{a-1}(1-x)^{b-1} dx$$

In addition, as an example, a selecting AI (AI beam selector) using reinforcement learning may consist of a reinforcement learning model and a beam direction regulator that controls a beam direction to a selected action. Herein, in the above-described MAB AI-based selecting AI, learning may be performed based on a reward but without state information, but in a reinforcement model, learning may be performed through a reward and state information. Herein, as compared with the MAB AI, state information is additionally used so that the operation of the learning model may be increased. In consideration of what is described above, a selecting AI (AI beam selector) may be configured not to select beam directions $(a_r(i_x), a_r(j_y))$ directly to an action but to select $\{\pm 1_x, \pm 1_y\}$ according to each azimuth and each altitude angle. However, as an example, a selecting AI (AI beam selector) based on reinforcement learning may also select directly beam directions $(a_r(i_x), a_r(j_y))$ by considering a case of having sufficient hardware specifications and is not limited to the above-described embodiment. As another example, a beam direction regulator may generate $$i_x^{(t)}$$

and $$j_y^{(t)}$$

by applying $\{\pm 1_x, \pm 1_y\}$ selected by a reinforcement learning model to previous direction value indexes $$i_x^{(t-1)} \text{ and } j_y^{(t-1)}$$

to finally generate $a_r(i_x)$, $a_r(j_y)$ and then transfer them to an IRS generator but may not be limited to a specific form.

Herein, like a selecting AI (or AI beam selector) using an MAB AI, a reinforcement learning model may consist of a learning unit and a selection unit and predict a next action simultaneously with learning. Herein, as an example, during reinforcement learning, learning may be performed through Q-Learning based on Equation 21 below, and a concrete action value may be expressed by Equation 25 below. In addition, in a policy selected in Q-Learning, an action with a largest action value in a current state $s_t$ may be expressed by Equation 26 below.

$$Q(s_t, a_t) \leftarrow (1 - \alpha)Q(s_t, a_t) + \alpha\left(r_{t+1} + \gamma \max_{a_{t+1} \in A} Q(s_{t+1}, a_{t+1})\right) \quad \text{[Equation 25]}$$

$$a_t = \underset{a \in A}{\operatorname{argmax}} \, Q(s_t, a) \quad \text{[Equation 26]}$$

In addition, as example, in reinforcement learning, an issue of adjustment may occur to exploration and exploitation. Herein, exploration may use sampled operations from a plurality of actions in order to obtain a better reward. On the other hand, exploitation may use pre-perceived information based on a repeated action. Herein, as an example, suitable adjustment of exploration and exploitation may be needed to achieve optimal performance in reinforcement learning, and an e-greedy method may be implemented, which may be as shown in FIG. 24. Herein, the e-greedy may be a method of performing exploration with a predetermined probability. As an example, in comparison with a greedy method using exploitation alone, the e-greedy may improve a total regret. In addition, the decaying e-greedy may be used as a method of logarithmically approaching a total regret according to time but may not be limited to a specific form.

As an example, Equation 27 below is an equation representing the decaying e-greedy, where c is a constant, AI is a size of an action space, and $\varepsilon_t$ is e-greedy according to time, which may decrease according to time and in inverse proportion to a square of a minimum regret.

$$c > 0, d = \min_{a|\Delta_a > 0} \Delta_a, \Delta_a = V^* - Q(a), \epsilon_t = \min\left\{1, \frac{c|A|}{d^2 t}\right\} \quad \text{[Equation 27]}$$

In addition, as an example, the adjustment of exploration and exploitation may be further optimized by using a multi-armed bandit (MAB). As an example, an upper confidence bound (UCB) or Thompson sampling (TS) may be applied and may not be limited to a specific form.

Herein, Equation 28 below may be an equation about an action based on a UCB, and Equation 29 may be an upper confidence. Herein, the upper confidence may be set to be inversely proportional to a number $N_t(a)$ of actions, so that more opportunities may be given to actions not selected. Based on what is described above, an opportunity may be halved according to time.

As an example, based on what is described above. Thompson sampling is implemented through a beta distribution and may adjust exploration and exploitation more simply and more easily than an UCB.

$$a_t = \underset{a \in A}{\operatorname{argmax}} \, \hat{Q}_t(a) + \hat{U}_t(a) \quad \text{[Equation 28]}$$

$$\hat{U}_t(a) = \sqrt{\frac{2 \log t}{N_t(a)}} \quad \text{[Equation 29]}$$

As another example, an IRS performance measuring instrument may perform at least any one function of standardization/normalization, batching, and weight application. Herein, the IRS performance measuring instrument may not only calculate an SNR, a channel gain, an MSE, and spectral efficiency based on a reference signal from a base station but also measure energy charging by using another monitoring system. Herein, each piece of measurement information may be a different domain of values.

Accordingly, a standardization/normalization block may standardize or normalize values of various domains of measurement information by considering each weight. In addition, a batching block may perform a role of accumulating such measurement information at a predetermined cycle and also perform normalization for each accumulation. In addition, as an example, a weight application block may express a final output value by applying a weight for each measurement indicator. As an example, a receiver with high importance of spectral efficiency may set a high weight of spectral efficiency measurement. Herein, an IRS performance measuring instrument may process measurement information and then generate a reward in a combined form. As another example, an IRS performance measuring instrument may generate a reward by separating individual pieces of measurement information and may not be limited to a specific embodiment.

Figure 27:
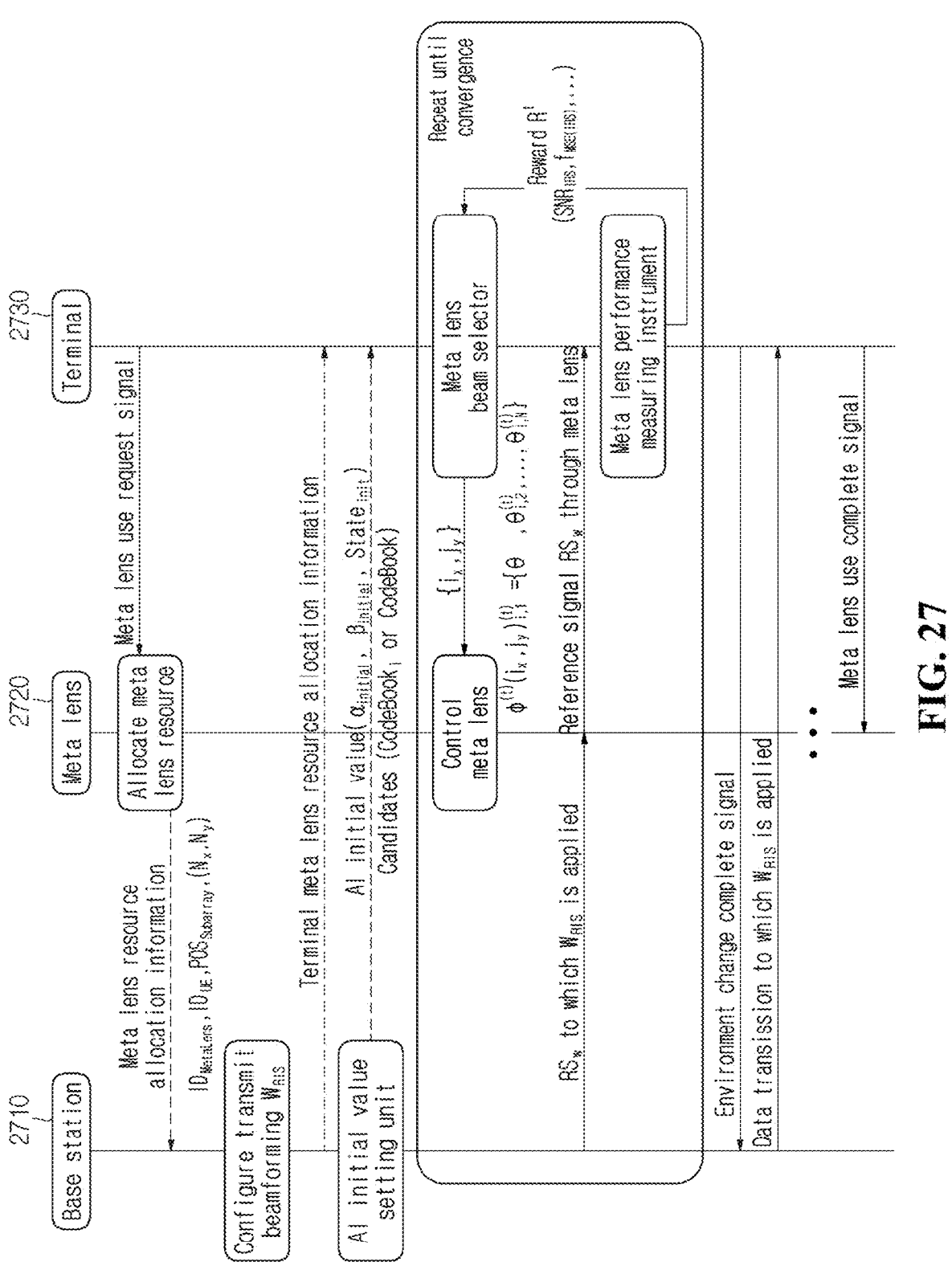
FIG. 27 is a view showing a method for setting an initial value of an artificial intelligence according to an embodiment of the present disclosure.

FIG. 27 is a view showing a method for setting an initial value of an artificial intelligence according to an embodiment of the present disclosure.

Referring to FIG. 27, an initial value of an artificial intelligence (AI) may be set based on an operation of an AI beam selector. As an example, a base station 2710 may transfer a reference signal to a terminal 2730. The terminal 2730 may perform measurement using the reference signal and obtain channel state information between the base station 2710 and the terminal 2730 based on the measurement. Next, the terminal 2730 may transfer the channel state information and position information of the terminal to the base station 2710. Herein, based on the received channel state information and position information of the terminal, the base station 2710 may set an AI initial value through an AI initial value setting unit.

As another example, an AI initial value setting unit may be implemented not in the base station 2710 but in another device or a cloud. Herein, the base station 2710 may transmit channel state information and position information received from the terminal 2730 to the AI initial value setting unit and obtain AI initial value information from the AI initial value setting unit. Herein, the AI initial value information may include initial values (Thompson sampling: $\alpha_{initial}$, $\beta_{initial}$) of a selecting AI used in an AI beam selector. In addition, as an example, when a learning model is based on reinforcement learning, the AI initial value information may further include the above-descried Thompson sampling parameters and state information $State_{init}$ but is not limited to the above-described embodiment.

Next, the base station 2710 may transmit the AI initial value information and candidates information to an IRS 2720. Herein, as an example, the candidates information may be index set information of a defined beam direction codebook. As another example, the candidates information may be information on the codebook itself. As an example, the codebook may be a set of beam direction vectors, which is used differently from a precoding matrix codebook used in MIMO (multi input multi output). That is, a beam direction vector used in the candidates may be a space of an action selected by an AI model. Herein, through the candidates, reinforcement learning or an MAB AI may quickly perform convergence of learning and also reduce an amount of calculation.

FIG. 27 may be a case where an AI beam selector is connected with a RIS controller. Herein, the RIS controller or an AI server may initialize an AI beam selector, which operates by an MAB AI (Thompson sampling) or reinforcement learning, through the above-described information that is received.

As another example, it is possible to consider a case where an AI beam selector is implemented in the base station 2710. Herein, as described above, the base station 2710 may transmit a reference signal to the terminal 2730 and obtain AI initial value information through an AI initial value setting unit based on channel state information and position information of the terminal. Next, the base station 2710 may reflect the above-described AI initial value information in the AI beam selector and then operate as described above.

In addition, as an example, an AI initial value setting unit may update a weight of a model that completes an operation. As an example, an updated weight may be used as an initial value of an MAB AI or an initial state of reinforcement learning and may not be limited to a specific embodiment.

In addition, as an example, an AI initial value setting unit may be designed in a predictor form that is a form of supervised learning. As an example, in case of Thompson sampling, initial values $\alpha_{init}$ and $\beta_{init}$ may be set and transmitted to an AI beam selector. Herein, prediction may be performed by considering a channel environment (e.g. SNR) and position information of a terminal. In addition, after communication is completed, $\alpha_{init}$, $\beta_{init}$, BLER, $\alpha_{final}$, $\beta_{final}$, position information, and channel information may be stored and used as learning data for transfer learning of an AI initial value setting unit.

An AI coding initial value setting unit may set an initial value by considering position information of a transmitter and a channel environment (signal-to-noise ratio (SNR)).

In case a meta lens has a lot of elements, because there are a lot of beam combinations selected by an AI beam selector, if too many beams are considered, an excessive load may occur to a terminal/base station, and a lot of time may be required for stabilization. However, according to a communication channel environment, a load may be reduced by securing initial values $\alpha_i$ and $\beta_i$ through pre-training for every generation matrix. As an example, performance may be expressed by Equation 30 below.

$$\text{Performance}_i = \frac{\alpha_i}{\beta_i} \qquad \text{[Equation 30]}$$

Herein, an AI coding initial value setting unit may make candidates for a generation matrix in a descending order of performance. Candidates may be generated differently according to a channel environment. Such candidates may be defined in forms of codebooks. A receiver may transfer a codebook set to be used by a transmitter in an index form. In addition, the receiver may directly transmit a code to be used by a transmitter.

An AI coding initial value setting unit may set initial values $\alpha_i$ and $\beta_i$ as well as candidates and transmit the values to a receiver. Herein, prediction may be performed by considering a channel environment and position information of a terminal. After communication is completed, $\alpha_i$, $\beta_i$, BLER, $\alpha_{final}$, $\beta_{final}$, position information, and channel information may be stored and used as learning data when re-training the AI coding initial value setting unit.

Figure 28:
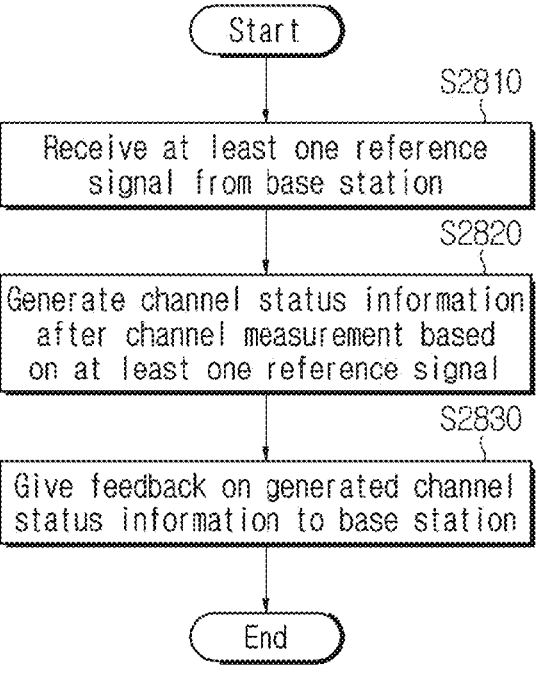
FIG. 28 is a flowchart showing a method for operating a terminal according to an embodiment of the present disclosure.

FIG. 28 is a flowchart showing a method for operating a terminal according to an embodiment of the present disclosure. Referring to FIG. 28, a terminal may receive at least one reference signal from a base station (S2810). Herein, the terminal may receive the reference signal through a RIS, and the reference signal may be a reference signal for configuring an initial beam between the base station and the RIS, as described above. Next, the terminal may generate channel state information after channel measurement based on the at least one reference signal (52820). Herein, the terminal may give feedback on the generated channel state information to the base station (S2830). Herein the channel state information may be given to the base station as feedback through the RIS. As an example, the at least one reference signal may be a reference signal that is transmitted from the base station to the terminal through the RIS, and first beamforming, which is transmitted from the base station to the RIS, may be determined based on feedback, and this is the same as described above. Herein, as an example, the terminal may transmit a first RIS use request signal to the RIS before receiving the at least one reference signal. The RIS use request signal may be the above-described meta lens use request signal and may be a use request signal for initial beam configuration. That is, the terminal may transmit the first RIS use request signal to the RIS before receiving the at least reference signal. Herein, the RIS may operate based on an initial recognition mode, and this is the same as described above. The initial recognition mode may be determined based on a number of sub-arrays and a minimum number of beams based on at least one meta lens element in the RIS.

In addition, the initial recognition mode may be determined according to a number of sub-arrays and a minimum number of beams that satisfy a frequency rate direction constant that is derived based on frequency rate learning information on a direction of the terminal, and this may be the same as in FIG. 16 and FIG. 17 described above. Herein, if there is no combination of the number of sub-arrays and the minimum number of beams that satisfy the frequency rate direction constant, the number of sub-arrays may be set to 1. As an example, when the number of sub-arrays is 1, the RIS may generate a fixed spherical wave, and this is the same as described above.

Next, after the above-described first beamforming is determined, the terminal may transfer a second RIS use request signal. Herein, the second RIS use request signal may be a RIS use request signal for determining second beamforming by determining a RIS control value after transmit beamforming from the base station to the RIS is configured, and it may be the above-described meta lens use request signal. Herein, the terminal may receive a reference signal for the first beamforming based on RIS resource information from the base station. The terminal may generate a RIS control value based on the reference signal for the first beamforming and transmit the RIS control value to the RIS. Herein, the terminal may perform communication based on the second beamforming that is generated by the RIS that is controlled based on the RIS control value. As an example, the second RIS use request signal may include at least any one of RIS ID information, terminal ID information, and sub-array position information, and this is the same as described above. Herein, the terminal may obtain at least any one of reward information and channel state information based on the reference signal for the first beamforming. Herein, the terminal may generate a RIS control value through at least any one of the reward information and the channel state information, and this is the same as described above. As another example, a RIS control value may be information, which is generated through a codebook based on a RIS direction vector set, and may not be limited to a specific form.

In addition, data may be transmitted together with a reference signal for first beamforming. That is, both a reference signal and data may be transferred together through first beamforming. Herein, a RIS may operate in an initial recognition mode for transmitting data to a terminal. As an example, a reference signal for first beamforming may be transmitted to a terminal through a first sub-array of a RIS, and data for the first beamforming may be transmitted to the terminal through a second sub-array of the RIS. That is, a sub-array for a reference signal and a sub-array for data may be different from each other. Herein, the first sub-array may be transmitted to the terminal through a beam that is changed based on at least one first sub-array element. Thus, the terminal may search for an optimal beam through the first sub-array and generate a RIS control value. In addition, the second sub-array may be transmitted to the terminal through a beam that is fixed based on an initial recognition mode, and thus the terminal may receive data from a base station.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

The embodiments of the present disclosure are applicable to various radio access systems. Examples of the various radio access systems include a 3rd generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

The invention claimed is:

1. A method performed by a terminal in a wireless communication system, the method comprising:
   receiving, from a base station, at least one reference signal;

performing a measurement based on the at least one reference signal;
   generating a measurement report related to channel state information based on the measurement; and
   transmitting, to the base station, the measurement report;
   wherein the at least one reference signal is transmitted from the base station to the terminal through a reconfigurable intelligent surface (RIS), and
   wherein first beamforming, controlled by the base station to, at the RIS is determined based on the measurement report;
   wherein the terminal transmits a first RIS use request signal to the RIS before receiving the at least one reference signal,
   the RIS operates in an initial recognition mode based on the first RIS use request signal, and
   wherein the initial recognition mode is determined based on a number of sub-arrays and a minimum number of beams related to at least one meta lens element in the RIS;
   wherein the initial recognition mode is determined based on the number of sub-arrays and the minimum number of beams that satisfy a frequency rate direction constant derived based on frequency rate learning information related to a terminal direction,
   wherein the number of sub-arrays is set to 1, in case that there is no combination of the number of sub-arrays and the minimum number of beams that satisfies the frequency rate direction constant, and wherein, based on the number of sub-arrays being 1, the RIS generates a fixed spherical wave.

2. The method of claim 1, wherein, after the first beamforming is determined, the terminal transmits a second RIS use request signal to the RIS and
   wherein the terminal receives, from the base station, a reference signal related to the first beamforming through the RIS based on RIS resource information allocated by the RIS.

3. The method of claim 2, further comprising:
   generating a RIS control value;
   transmitting, to the RIS, the RIS control value based on the reference signal related to the first beamforming; and
   performing communication based on second beamforming performed by the RIS that is controlled based on the RIS control value.

4. The method of claim 2, wherein the second RIS use request signal includes at least one of RIS ID information, terminal ID information, and sub-array position information.

5. The method of claim 1, wherein, after the first beamforming is determined, the terminal transmits a second RIS use request signal to the RIS and
   wherein the terminal receives a reference signal and data related to the first beamforming from the base station through the RIS based on RIS resource information that is allocated by the RIS.

6. The method of claim 5, further comprising:
   generating a RIS control valuee;
   transmitting, to the RIS, the RIS control value based on the reference signal related to the first beamforming; and
   performing communication based on second beamforming generated by the RIS that is controlled based on the RIS control value.

7. The method of claim 6, wherein the terminal obtains at least one reward information and channel state information based on the reference signal related to the first beamforming, and wherein the terminal generates the RIS control value through at least one of the reward information and the channel state information.

8. The method of claim 7, wherein the RIS control value is generated by using a codebook based on a RIS direction vector set.

9. The method of claim 6, wherein, in case that the data related to the first beamforming, is transmitted to the terminal through the RIS, the RIS operates in the initial recognition mode.

10. The method of claim 9, wherein the reference signal related to the first beamforming is transmitted to the terminal through a first sub-array of the RIS, and wherein the data related to the first beamforming is transmitted to the terminal through a second sub-array of the RIS.

11. The method of claim 10, wherein the first sub-array is transmitted to a terminal through a beam that is configured based on at least one first sub-array element, and wherein the second sub-array is transmitted to the terminal through a beam that is fixed based on the initial recognition mode.

12. A terminal in a wireless communication system, the terminal comprising:

a transceiver; and a processor coupled to the transceiver, wherein the processor is configured to:

receive, from a base station, at least one reference signal, perform a measurement based on the at least one reference signal, generate a measurement report related to channel state information based on the measurement, and transmit, to the base station, the measurement report, wherein the at least one reference signal is transmitted from the base station to the terminal through a reconfigurable intelligent surface (RIS), and wherein first beamforming, controlled by the base station at RIS is determined based on the measurement report; wherein the terminal transmits a first RIS use request signal to the RIS before receiving the at least one reference signal, the RIS operates in an initial recognition mode based on the first RIS use request signal, and wherein the initial recognition mode is determined based on a number of sub-arrays and a minimum number of beams related to at least one meta lens element in the RIS;

wherein the initial recognition mode is determined based on the number of sub-arrays and the minimum number of beams that satisfy a frequency rate direction constant derived based on frequency rate learning information related to a terminal direction, wherein the number of sub-arrays is set to 1, in case that there is no combination of the number of sub-arrays and the minimum number of beams that satisfies the frequency rate direction constant, and wherein, based on the number of sub-arrays being 1, the RIS generates a fixed spherical wave.

13. A base station in a wireless communication system, the base station comprising:

a transceiver; and a processor coupled to the transceiver, wherein the processor is configured to:

transmit, to a terminal, at least one reference signal, and receive a measurement report related to channel state information based on a measurement performed by the terminal that received the at least one reference signal, wherein the at least one reference signal is transmitted from the base station to the terminal through a reconfigurable intelligence surface (RIS), wherein first beamforming, controlled by the base station to, at RIS is determined based on the measurement report; wherein the terminal transmits a first RIS use request signal to the RIS before receiving the at least one reference signal, the RIS operates in an initial recognition mode based on the first RIS use request signal, and wherein the initial recognition mode is determined based on a number of sub-arrays and a minimum number of beams related to at least one meta lens element in the RIS;

wherein the initial recognition mode is determined based on the number of sub-arrays and the minimum number of beams that satisfy a frequency rate direction constant derived based on frequency rate learning information related to a terminal direction, wherein the number of sub-arrays is set to 1, in case that there is no combination of the number of sub-arrays and the minimum number of beams that satisfies the frequency rate direction constant, and wherein, based on the number of sub-arrays being 1, the RIS generates a fixed spherical wave.

* * * * *